United States Patent
Nakamura et al.

(10) Patent No.: US 11,522,430 B2
(45) Date of Patent: Dec. 6, 2022

(54) LINEAR VIBRATION ACTUATOR

(71) Applicant: Adamant Namiki Precision Jewel Co., Ltd., Tokyo (JP)

(72) Inventors: Kazuya Nakamura, Tokyo (JP); Motoichi Nakamura, Tokyo (JP); Chihiro Okamoto, Tokyo (JP); Takeshi Kogawa, Kuroishi (JP)

(73) Assignee: Adamant Namiki Precision Jewel Co., Ltd., Tokyo (JP)

( * ) Notice: Subject to any disclaimer, the term of this patent is extended or adjusted under 35 U.S.C. 154(b) by 281 days.

(21) Appl. No.: 16/939,214

(22) Filed: Jul. 27, 2020

(65) Prior Publication Data

US 2020/0358347 A1 Nov. 12, 2020

Related U.S. Application Data

(63) Continuation of application No. PCT/JP2019/002943, filed on Jan. 29, 2019.

(30) Foreign Application Priority Data

Feb. 1, 2018 (JP) .............................. JP2018-016533

(51) Int. Cl.
*H02K 33/16* (2006.01)

(52) U.S. Cl.
CPC .................................... *H02K 33/16* (2013.01)

(58) Field of Classification Search
CPC .. H02K 2213/03; H02K 35/02; H02K 41/031; H02K 41/02; H02K 41/03;

(Continued)

(56) References Cited

U.S. PATENT DOCUMENTS

| 2012/0187780 A1* | 7/2012 | Bang | H02K 33/16 |
| | | | 310/25 |
| 2014/0265651 A1* | 9/2014 | Kim | H02K 33/16 |
| | | | 310/25 |

(Continued)

FOREIGN PATENT DOCUMENTS

| CN | 104617734 A | 5/2015 |
| CN | 105103422 A | 11/2015 |

(Continued)

OTHER PUBLICATIONS

An Office Action mailed by China National Intellectual Property Administration dated Jan. 28, 2021, which corresponds to Chinese Patent Application No. 201980007102.7 and is related to U.S. Appl. No. 16/939,214; with English language translation.

(Continued)

*Primary Examiner* — Bryan R Perez
(74) *Attorney, Agent, or Firm* — Studebaker & Brackett PC

(57) ABSTRACT

A linear vibration actuator includes: a mover having a plurality of magnets linearly arrayed in the vibration direction; a guide portion holding the mover to be allowed to linearly move in the vibration direction; a plurality of planar coils wound in a flat plate shape on a flat surface facing the mover; a pair of first biasing magnets respectively arranged at both ends of the mover in the vibration direction; and a pair of second biasing magnets that are respectively arranged facing the pair of first biasing magnets, and respectively have the same polarities as those of the pair of first biasing magnets to bias the mover in the vibration direction.

20 Claims, 23 Drawing Sheets

(58) Field of Classification Search
CPC .. H02K 41/0356; H02K 41/033; H02K 33/16; H02K 33/02; H02K 33/06; H02K 33/12; H02K 33/18; H02K 33/00; B06B 1/04; B06B 1/045
See application file for complete search history.

(56) References Cited

U.S. PATENT DOCUMENTS

| | | |
|---|---|---|
| 2016/0226359 A1* | 8/2016 | Guo ........................ H02K 33/16 |
| 2016/0226361 A1 | 8/2016 | Guo et al. |
| 2017/0033659 A1 | 2/2017 | Wang et al. |
| 2017/0279343 A1* | 9/2017 | Katada ..................... H02K 5/16 |
| 2018/0001348 A1* | 1/2018 | Ishii ........................ H02K 33/02 |
| 2018/0111163 A1* | 4/2018 | Xu .......................... B06B 1/045 |

FOREIGN PATENT DOCUMENTS

| | | |
|---|---|---|
| JP | H10146564 A | 6/1998 |
| JP | 2002254030 A | 9/2002 |
| JP | 2010029744 A | 2/2010 |
| JP | 2016131916 A | 7/2016 |
| JP | 2017029971 A | 2/2017 |
| JP | 2017063583 A | 3/2017 |
| JP | 2017136592 A | 8/2017 |
| JP | 2017175838 A | 9/2017 |

OTHER PUBLICATIONS

International Search Report issued in PCT/JP2019/002943; dated May 7, 2019.

* cited by examiner

A-A

B-B

LINEAR VIBRATION ACTUATOR

CROSS-REFERENCE TO RELATED APPLICATION

The present application is a continuation application of International Application No. PCT/JP2019/002943, filed on Jan. 29, 2019, which claims priority to Japanese Patent Application No. 2018-016533, filed on Feb. 1, 2018. The contents of these applications are incorporated herein by reference in their entirety.

BACKGROUND

1. Technical Field

One aspect of the present disclosure relates to a linear vibration actuator.

2. Related Art

Typically, for example, the linear vibration actuator that linearly vibrates a mover has been widely used as a device constituting a vibration function in a mobile device such as a smartphone (see, for example, JP-A-2017-063583). The linear vibration actuator described in JP-A-2017-063583 has the mover including a magnet, and a coil disposed near the magnet. An alternating drive current is supplied to the coil, so that the mover is linearly vibrated.

In such a linear vibration actuator, in many cases, mechanical springs such as a coil spring or a leaf spring are arranged between both ends of the mover in a vibration direction and an inner wall of a housing. The mover vibrates while receiving a biasing force of the springs. At this time, the mover has a resonance frequency determined by spring constants of the springs at both ends in the housing. In many cases, an AC current having a frequency corresponding to the resonance frequency of the mover is supplied, as the drive current, to a drive coil of such a linear vibration actuator. The mover can be resonated by supplying such a drive current. Therefore, a large driving force for vibrating the mover can be obtained.

SUMMARY

A linear vibration actuator includes: a housing that extends in a predetermined vibration direction; a mover that is housed in the housing, extends in the vibration direction, and has a plurality of magnets linearly arrayed in the vibration direction; a guide portion that is housed in the housing and holds the mover to be allowed to linearly move in the vibration direction; a plurality of planar coils that are housed in the housing, are wound in a flat plate shape on a flat surface which is in the vibration direction and faces the mover, and linearly vibrate the mover in the vibration direction when receiving a drive current; a pair of first biasing magnets that are respectively arranged at both ends of the mover in the vibration direction; and a pair of second biasing magnets that are respectively arranged facing the pair of first biasing magnets in the housing, and respectively have the same polarities as those of the pair of first biasing magnets to bias the mover in the vibration direction.

DETAILED DESCRIPTION

Figure 1:
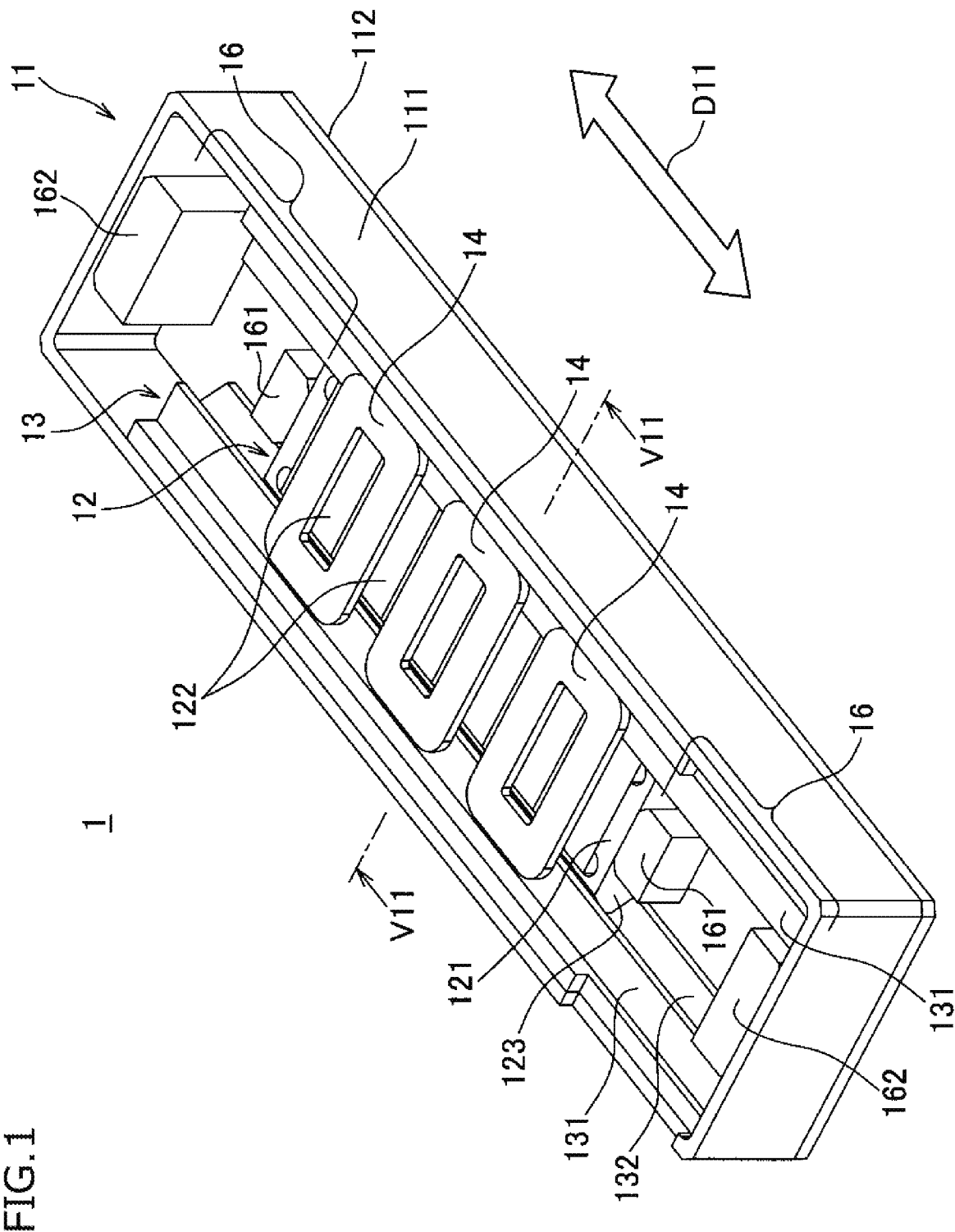
FIG. 1 illustrates a linear vibration actuator according to an embodiment of the present disclosure.

In the linear vibration actuator described in JP-A-2017-063583, the resonance frequency determined by the above mechanical spring is a very narrow band frequency. On the other hand, in the field of linear vibration actuator, there is a demand for vibrating the mover at a vibration frequency having a certain width. Further, when the mechanical spring is subjected to stress repeatedly for tens of millions of times even within elastic limit, it may eventually lead to fatigue failure. Therefore, it is desired to reduce a risk of fatigue failure.

An object of the present disclosure is to provide a linear vibration actuator as follows. The linear vibration actuator can vibrate the mover at the vibration frequency having a certain width, and has a long service life with less risk of deterioration of a spring portion and the like.

A linear vibration actuator according to one aspect of the present disclosure (the present linear vibration actuator) includes: a housing that extends in a predetermined vibration direction; a mover that is housed in the housing, extends in the vibration direction, and has a plurality of magnets linearly arrayed in the vibration direction; a guide portion that is housed in the housing and holds the mover to be allowed to linearly move in the vibration direction; a plurality of planar coils that are housed in the housing, are wound in a flat plate shape on a flat surface which is in the vibration direction and faces the mover, and linearly vibrate the mover in the vibration direction when receiving a drive current; a pair of first biasing magnets that are respectively arranged at both ends of the mover in the vibration direction; and a pair of second biasing magnets that are respectively arranged facing the pair of first biasing magnets in the housing, and respectively have the same polarities as those of the pair of first biasing magnets to bias the mover in the vibration direction.

In the present linear vibration actuator, the mover is biased in the vibration direction by a repulsive force of the first biasing magnets arranged at the both ends of the mover and the second biasing magnets arranged facing the first biasing magnets. When such a biasing structure using the repulsive force of the magnet is regarded as a spring, the spring by the magnet (referred to as a magnetic spring) is different from a general linear spring having a spring force proportional to a deformation amount and is a nonlinear spring. At this time, in the linear vibration actuator that biases the mover using the general linear spring, the resonance frequency of the mover is a very narrow band frequency as described above. In contrast, in the present linear vibration actuator that uses the magnetic spring to bias the mover, the resonance frequency of the mover is a wide band frequency because the magnetic spring is the nonlinear spring. Therefore, according to the present linear vibration actuator, it is possible to vibrate the mover at the vibration frequency having a certain width in such a wide band.

When the mechanical spring such as a coil spring or a leaf spring is used unlike the present disclosure, a stress caused by vibration of the mover is applied to a connecting portion between the mechanical spring and the mover and the housing. Therefore, if the mechanical spring is used, the connecting portion may be deteriorated. In contrast, according to the present linear vibration actuator, the above magnetic spring is used to bias the mover. Therefore, there is no mechanical connecting portion that is stressed by the vibration of the mover. Further, unlike the mechanical spring, the spring itself is less likely to lead to fatigue failure. Therefore, according to the present linear vibration actuator, it is possible to suppress the above-described concern about the deterioration due to biasing to the mover, thereby extending life of a device.

According to technology of the present disclosure, it is possible to provide a small-sized, high-performance and long-life linear vibration actuator.

A linear vibration actuator according to the present embodiment includes: a housing that extends in a predetermined vibration direction; a mover that is housed in the housing, extends in the vibration direction, and has a plurality of magnets linearly arrayed in the vibration direction; a guide portion that is housed in the housing and holds the mover to be allowed to linearly move in the vibration direction; a plurality of planar coils that are housed in the housing, are wound in a flat plate shape on a flat surface which is in the vibration direction and faces the mover, and linearly vibrate the mover in the vibration direction when receiving a drive current; a pair of first biasing magnets that are respectively arranged at both ends of the mover in the vibration direction; and a pair of second biasing magnets that are respectively arranged facing the pair of first biasing magnets in the housing, and respectively have the same polarities as those of the pair of first biasing magnets to bias the mover in the vibration direction.

With this configuration, the mover of the linear vibration actuator is biased in the vibration direction by a repulsive force of the first biasing magnets arranged at the both ends of the mover and the second biasing magnets arranged facing the first biasing magnets. When such a biasing structure using the repulsive force of the magnet is regarded as a spring, the spring by the magnet (referred to as a magnetic spring) is different from a general linear spring having a spring force proportional to a deformation amount and is a nonlinear spring. At this time, in the linear vibration actuator that biases the mover using the general linear spring, the resonance frequency of the mover is a very narrow band frequency as described above. In contrast, in the present linear vibration actuator that uses the magnetic spring to bias the mover, the resonance frequency of the mover is a wide band frequency because the magnetic spring is the nonlinear spring. Therefore, according to the present linear vibration actuator, it is possible to vibrate the mover at the vibration frequency having a certain width in such a wide band.

In the linear vibration actuator according to the present embodiment, the mover includes an outer frame portion, and the magnets linearly arrayed in the vibration direction and the pair of first biasing magnets may be held integrally with the outer frame portion.

With this configuration, the outer frame portion can highly accurately and satisfactorily position and hold the magnets linearly arrayed and the pair of first biasing magnets.

In the linear vibration actuator according to the present embodiment, the magnets linearly arrayed in the vibration direction are fixedly arranged inside the outer frame portion in a state of being surrounded on at least four sides, and the pair of first biasing magnets may be fixedly arranged outside the outer frame portion in the vibration direction.

With this configuration, it is possible to easily arrange the magnets linearly arrayed and the pair of first biasing magnets, and to highly accurately and satisfactorily position and hold them.

In the linear vibration actuator according to the present embodiment, an array of the magnets in the mover may be an array including an N-S array in which magnetizing directions of two adjacent magnets are perpendicular to the flat surface and opposite to each other.

With this configuration, the mover can obtain a magnetic force of substantially uniform magnitude toward each of the flat surfaces on which the planar coils are arranged. Thus, it is easy to stabilize a position of the mover. Therefore, the mover can be stably vibrated.

In the linear vibration actuator according to the present embodiment, the array of the magnets in the mover may be an array including a Halbach array in which a magnetizing direction of one of the two adjacent magnets is perpendicular to the flat surface, while a magnetizing direction of the other magnet is parallel to the vibration direction.

With this configuration, the mover is set so that the magnetic force in a desired direction is increased by the Halbach array. Therefore, a large driving force can be obtained from the planar coils located in a direction of an increased magnetic force and disposed on one flat surface.

In the linear vibration actuator according to the present embodiment, when the array of the magnets includes the Halbach array, the first biasing magnet may also serve as the other magnet at both ends of the Halbach array in the vibration direction.

With this configuration, the first biasing magnet also serves as the magnet constituting the Halbach array. Therefore, even if a total number of magnets used in the mover is reduced, magnetic flux density interlinked to the coil can be increased.

In the linear vibration actuator according to the present embodiment, a width of winding of the planar coil in the vibration direction may be equal to or less than a length of the one magnet constituting the Halbach array in the vibration direction.

With this configuration, even if the mover moves from a midpoint by vibration, more magnetic flux is interlinked to the coil. Therefore, thrust can be generated in the mover in a longer section during one cycle of vibration.

In the linear vibration actuator according to the present embodiment, the flat surface may include a pair of flat surfaces sandwiching the mover between the flat surfaces.

With this configuration, the planar coils are arranged on the pair of flat surfaces. Thus, a larger thrust can be generated in the mover as compared with a case where the planar coils are arranged only on one flat surface.

In the linear vibration actuator according to the present embodiment, the guide portion may include a rail member having a guide groove in which an end edge of the mover in the vibration direction is fitted linearly movable in the vibration direction, and there may be further provided a first floating magnet arranged on the edge of the mover, and a second floating magnet that is disposed facing the first floating magnet on an inner surface of the guide groove and has the same polarity as a polarity of the first floating magnet so that the end edge is floated from the inner surface of the guide groove.

With this configuration, the mover floats from the guide groove when the mover and the guide groove slide depending on operating conditions of the mover. Further, even if they contact each other, a contact area between them is small. Therefore, friction between the mover and the guide groove can be reduced.

In the linear vibration actuator according to the present embodiment, the guide portion may include a rail member having a guide groove in which an end edge of the mover in the vibration direction is fitted linearly movable in the vibration direction. The flat surface on which the planar coils are arranged may be one, and there may be further provided a first floating member disposed on a surface of the mover opposite to a side facing the flat surface on which the planar coils are arranged, and a second floating member disposed facing the first floating member on an inner surface of the housing. The first floating member and the second floating member may be configured to float the end edge of the mover from the inner surface of the guide groove in combination. The combination of the first floating member and the second floating member may be magnets, the magnet and a magnetic body, or the magnetic body and the magnet, which have mutually opposite polarities.

With this configuration, the mover can be vibrated smoothly and linearly. Further, since the number of magnets used can be reduced, manufacturing cost can be reduced.

In the linear vibration actuator according to the present embodiment, regarding configuration of the guide portion, the guide portion may be a rod-shaped guide shaft, the guide shaft may slidably hold the mover, and a holder that can slide with the guide shaft may be formed on the outer frame portion of the mover.

With this configuration, the mover can be easily positioned with high accuracy and held.

In the linear vibration actuator according to the present embodiment, the mover may have a plurality of mover portions which is arranged in the vibration direction and in which adjacent mover portions are elastically connected to each other.

With this configuration, it is possible to generate a plurality of resonance frequencies. Therefore, an amplitude of the mover can be increased within a wide band range.

In the linear vibration actuator according to the present embodiment, the housing may include a peripheral wall portion, a bottom plate portion, and a ceiling plate portion, and the peripheral wall portion may be formed of a soft magnetic material.

With this configuration, it is possible to suppress leakage magnetic flux from permanent magnets arranged in the housing. Therefore, the mover can be vibrated more efficiently. Further, influence of magnetic noise on external equipment can be suppressed.

In the linear vibration actuator according to the present embodiment, regarding the material of the bottom plate portion and the ceiling plate portion, at least a portion of the bottom plate portion and the ceiling plate portion, that faces the magnets linearly arrayed in the vibration direction may be formed of a non-magnetic material.

With this configuration, it is possible to suppress reduction in driving force due to magnetic attraction between the housing and the magnets arrayed in the mover.

In the linear vibration actuator according to the present embodiment, the bottom plate portion and the ceiling plate portion may be each divided into three, and both ends of the three may be formed of the soft magnetic material.

With this configuration, it is possible to suppress the leakage magnetic flux from the magnetic spring including the first biasing magnet and the second biasing magnet. Therefore, a larger biasing force can be obtained, and collision of the magnets can be suppressed.

Next, preferred examples having the above characteristics will be described in detail with reference to the drawings.

In the drawings for describing the examples, the same reference numerals are used for some common components.

EXAMPLE 1

Figure 2:
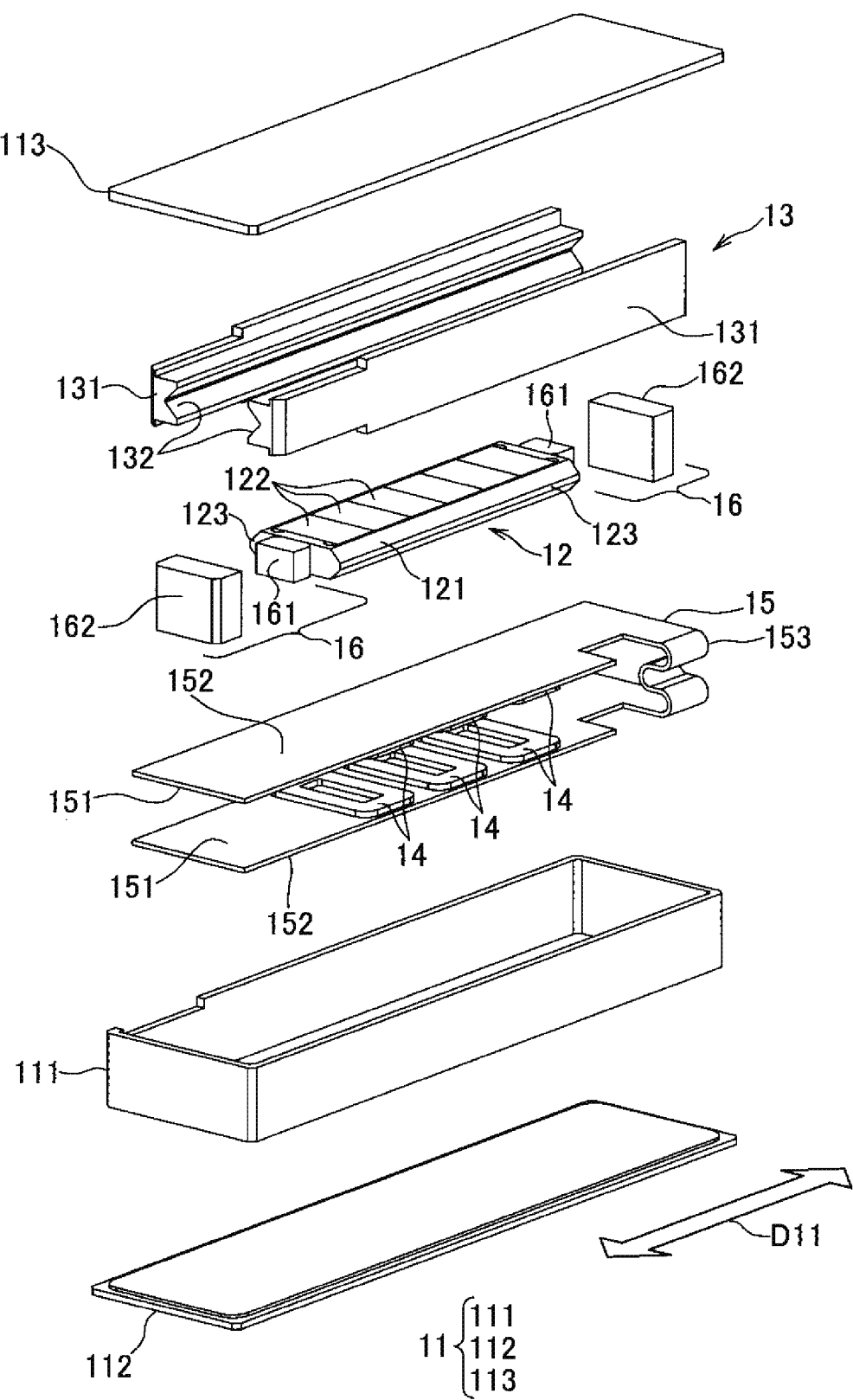
FIG. 2 is an exploded perspective view of the linear vibration actuator illustrated in FIG. 1.

FIG. 1 illustrates a linear vibration actuator according to an embodiment of the present disclosure. FIG. 2 is an exploded perspective view of the linear vibration actuator illustrated in FIG. 1.

A linear vibration actuator 1 of the present embodiment is configured to linearly vibrate a mover 12 in a predetermined vibration direction D11. The linear vibration actuator 1 includes a housing 11, a mover 12, a guide portion 13, a planar coil 14, a coil holder 15, and a pair of magnetic springs 16.

The housing 11 is a rectangular parallelepiped box extending in the vibration direction D11. At least a part of the housing 11 is made of the magnetic material. The housing 11 includes a peripheral wall portion 111, a bottom wall portion 112, and a ceiling wall portion 113. In FIG. 1, the ceiling wall portion 113 and the coil holder 15 are not illustrated so that an internal structure of the linear vibration actuator 1 can be seen.

The mover 12 is a rectangular parallelepiped member housed in the housing 11 and extending in the vibration direction D11. The mover 12 includes an outer frame portion 121 and a plurality of magnets 122. The magnets 122 are fitted in the outer frame portion 121 in a state of being linearly arrayed in the vibration direction D11. The array of the magnets 122 will be described in detail below. The outer frame portion 121 is a rectangular frame that houses the magnets 122 therein. That is, the magnets 122 are fixedly arranged inside the outer frame portion 121 in the state of being surrounded on at least four sides. Each of a pair of end edges 123 in the vibration direction D11 in the outer frame portion 121 is projected such that a cross-section perpendicular to the vibration direction D11 has a V-shape projecting outwardly of the outer frame portion 121.

The guide portion 13 is housed in the housing 11 and holds the mover 12 so as to be linearly movable in the vibration direction D11. The guide portion 13 includes a pair of rail members 131. Each rail member 131 has a guide groove 132. The end edge 123 of the mover 12 having a V-shaped cross-section is fitted into the guide groove 132 so as to be linearly movable in the vibration direction D11. The guide groove 132 is a V-shaped groove formed so that its cross-section perpendicular to the vibration direction D11 has a V-shape recessed outwardly of the housing 11.

The combination of shapes of the outer frame portion 121 and the guide groove 132 in the cross-section perpendicular to the vibration direction D11 is not limited to a projecting V-shape and a recessed V-shape. The combination may be, for example, a combination of a projecting U-shape and a recessed U-shape, or another combination of a projecting shape and a recessed shape.

The shape of the outer frame portion 121 or the guide groove 132 in the cross-section perpendicular to the vibration direction D11 may be a shape having a partial cutout or a shape having a partial recess. In this case, when the outer frame portion 121 and the guide groove 132 slide depending on the operating conditions of the mover 12, the contact area between them is small, so that the friction can be reduced.

Planar coils 14 are arranged three on each of a pair of flat surfaces 151. The pair of flat surfaces 151 is in the vibration direction D11 and sandwiches the mover 12 between them. Each planar coil 14 is wound in a ring shape (flat shape) so as to extend planarly in an in-plane direction on each flat surface 151. Here, the pair of flat surfaces 151 on which the planar coils 14 are arranged is one portion of the coil holder 15 described below. The planar coils 14 linearly vibrate the mover 12 in the vibration direction D11 by Lorentz force applied between the magnets 122 in the mover 12 and the planar coil 14 when an AC current is passed through the planar coil 14 as a drive current.

Figure 4:
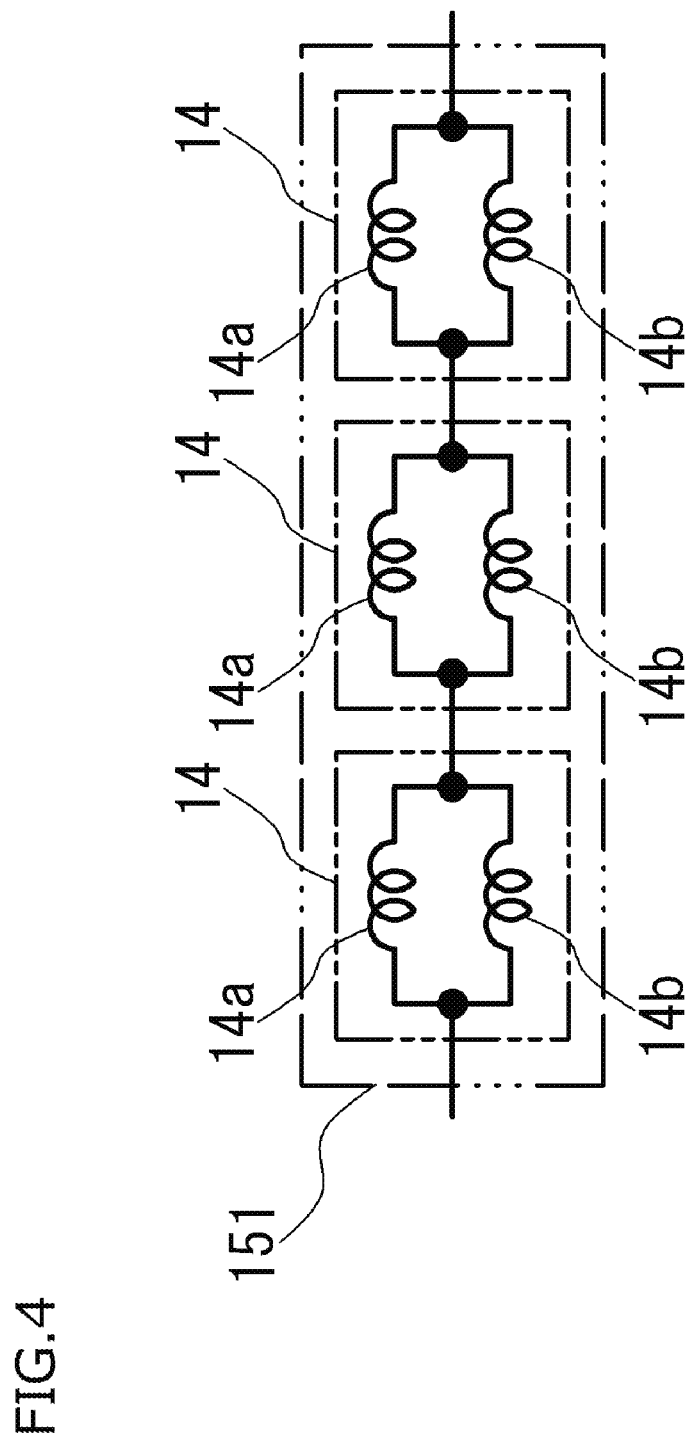
FIG. 4 is a schematic view illustrating an example of an electrical connection method of planar coils used in the linear vibration actuator illustrated in FIG. 1.

Each planar coil 14 may be formed of a plurality of coils connected in parallel. For example, as illustrated in a schematic view of FIG. 4, the planar coil 14 may be formed by connecting a coil 14a and a coil 14b in parallel. Then, three planar coils 14 may be arranged in series on the flat surface 151. In this way, by connecting two coils of the coil 14a and the coil 14b in parallel, the number of turns of the winding that allows the maximum allowable current to flow can be doubled as compared with a case where the coils are not connected in parallel. As a result, twice the thrust of the mover 12 can be obtained as compared with the case where the coils are not connected in parallel.

The coil holder 15 is an integrated flexible wiring board (FPC) housed in the housing 11. The coil holder 15 has a pair of rectangular plate portions 152 that extend in the vibration direction D11 and sandwich the mover 12 between them, and a connecting portion 153 that connects the pair of rectangular plate portions 152. A surface of each rectangular plate portion 152 facing the mover 12 is the flat surface 151 on which the planar coils 14 are arranged. The connecting portion 153 connects end portions of the rectangular plate portions 152 in the vibration direction D11 at edges of the rectangular plate portions 152 in the vibration direction D11. The FPC that is the coil holder 15 has flexibility. The connecting portion 153 is formed by bending a part of the coil holder 15.

In the present example, the coil holder 15 having the pair of rectangular plate portions 152 and the connecting portion 153 is formed by using an integral FPC. In this regard, each of the pair of rectangular plate portions 152 may be formed of a separate, inflexible substrate such as a glass epoxy substrate. At this time, the FPC or an electric wire is used as the connecting portion 153, so that the pair of rectangular plate portions 152 is connected by the connecting portion 153.

For example, in the case of using the mover in which the magnetic force of one surface is increased by using the Halbach array, which will be described below, and in the case of prioritizing thinning of the linear vibration actuator 1, the coil holder 15 can also be configured to have one rectangular plate portion 152 on which the planar coils 14 are arranged.

The pair of magnetic springs 16 is a member that biases the mover 12 in the vibration direction D11 by the repulsive force of the magnets. Each of the pair of magnetic springs 16 is respectively arranged at the both ends of the mover 12 in the vibration direction D11. Each magnetic spring 16 includes a first biasing magnet 161 and a second biasing magnet 162. The first biasing magnet 161 is disposed at each end of the mover 12 in the vibration direction D11. That is, the first biasing magnet 161 is fixedly arranged outside the outer frame portion 121 in the vibration direction D11. Therefore, the plurality of magnets 122 of the mover 12 and the pair of first biasing magnets 161 are held integrally with the outer frame portion 121.

The second biasing magnets 162 are respectively arranged to face the first biasing magnets 161, in the housing 11. The second biasing magnet 162 has the same polarity as the first biasing magnet 161. Each magnetic spring 16 biases the mover 12 in the vibration direction D11 away from the inner wall of the housing 11 by the repulsive force generated between the first biasing magnet 161 and the second biasing magnet 162 having the same polarity.

In the linear vibration actuator 1 described above, the mover 12 is biased by the pair of magnetic springs 16. As a result, the mover 12 has vibration characteristics as described below.

Figure 3:
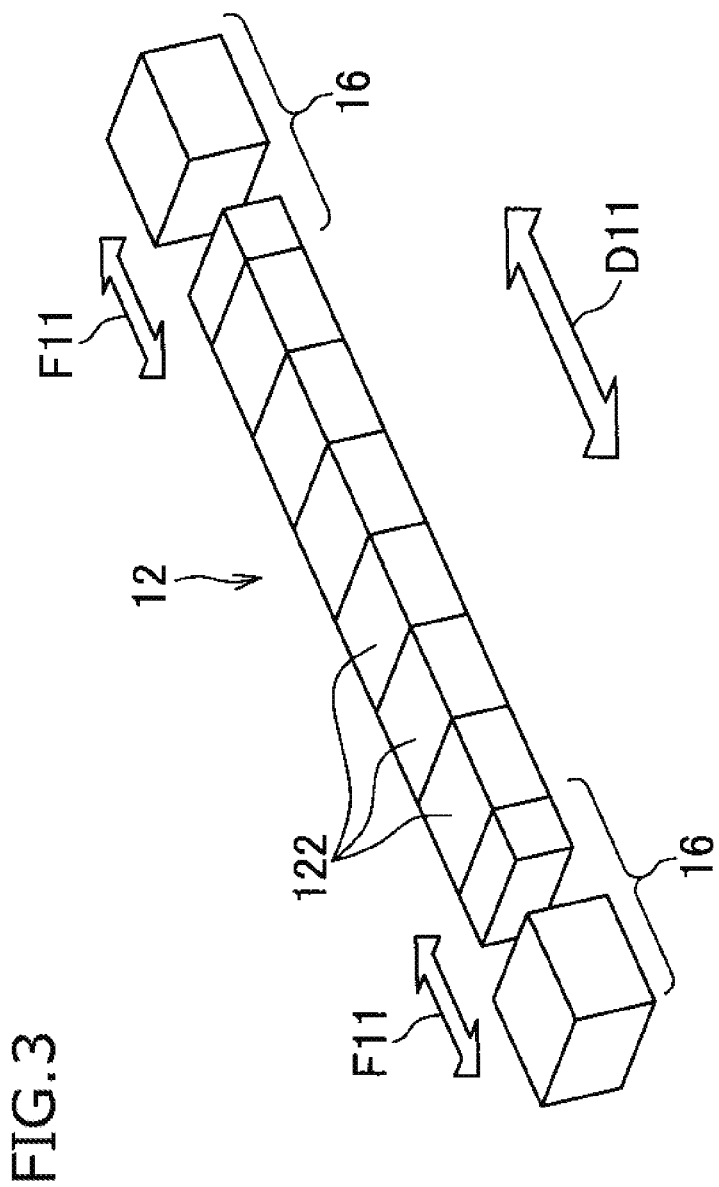
FIG. 3 is a view schematically illustrating a state in which a mover is biased by a pair of magnetic springs in the linear vibration actuator illustrated in FIGS. 1 and 2.

FIG. 3 is a view schematically illustrating how the mover is biased by the pair of magnetic springs in the linear vibration actuator illustrated in FIGS. 1 and 2.

Generally, the mechanical spring such as the coil or the leaf spring is the linear spring having a spring force proportional to an amount of displacement of the spring. In contrast, in the present embodiment, in the magnetic spring 16 employed to bias the mover 12, a repulsive force F11 between the magnets, which corresponds to the spring force, is inversely proportional to square of an amount of change in distance between the springs, which corresponds to the amount of displacement of the spring. That is, the magnetic spring 16 is the nonlinear spring.

When the magnetic spring 16 is replaced with the mechanical spring, the vibration characteristics of the mover 12 have a steep peak in the middle. That is, in this case, the vibration characteristics of the mover 12 have a resonance frequency in a very narrow band.

In contrast, in the present embodiment in which the magnetic spring 16 is employed, in the vibration characteristics of the mover 12, acceleration gradually increases and reaches a peak. Therefore, the vibration characteristic of the mover 12 have a resonance frequency in a wide band.

In the linear vibration actuator 1, by vibrating the mover 12 at a frequency in a band in which acceleration a exceeds a certain value, vibration intensity required for a vibration function or the like of a smartphone or the like is realized, for example. At this time, in the linear vibration actuator 1, the resonance frequency of the mover 12 is the wide band frequency as described above. Therefore, the band in which the vibration intensity required for the vibration function or the like can be obtained is wide. According to the present embodiment, the mover 12 can be vibrated at the vibration frequency having a certain width in such a wide band.

Unlike the present embodiment, when the mechanical spring such as the coil spring or the leaf spring is used, the stress caused by the vibration of the mover 12 is applied to the connecting portion between the mechanical spring and the mover 12 and the housing 11. Therefore, when the mechanical spring is used, the connecting portion may be deteriorated. In contrast, in the present embodiment, the magnetic spring 16 is used to bias the mover 12. Therefore, there is no mechanical connecting portion that is stressed by the vibration of the mover 12. Therefore, according to the present embodiment, it is possible to suppress the above-described deterioration due to the biasing for the mover 12, and thus it is also possible to extend the life of the device.

Next, the array of the magnets 122 in the mover 12 will be described with reference to two examples of the N-S array and the Halbach array.

Figure 5:
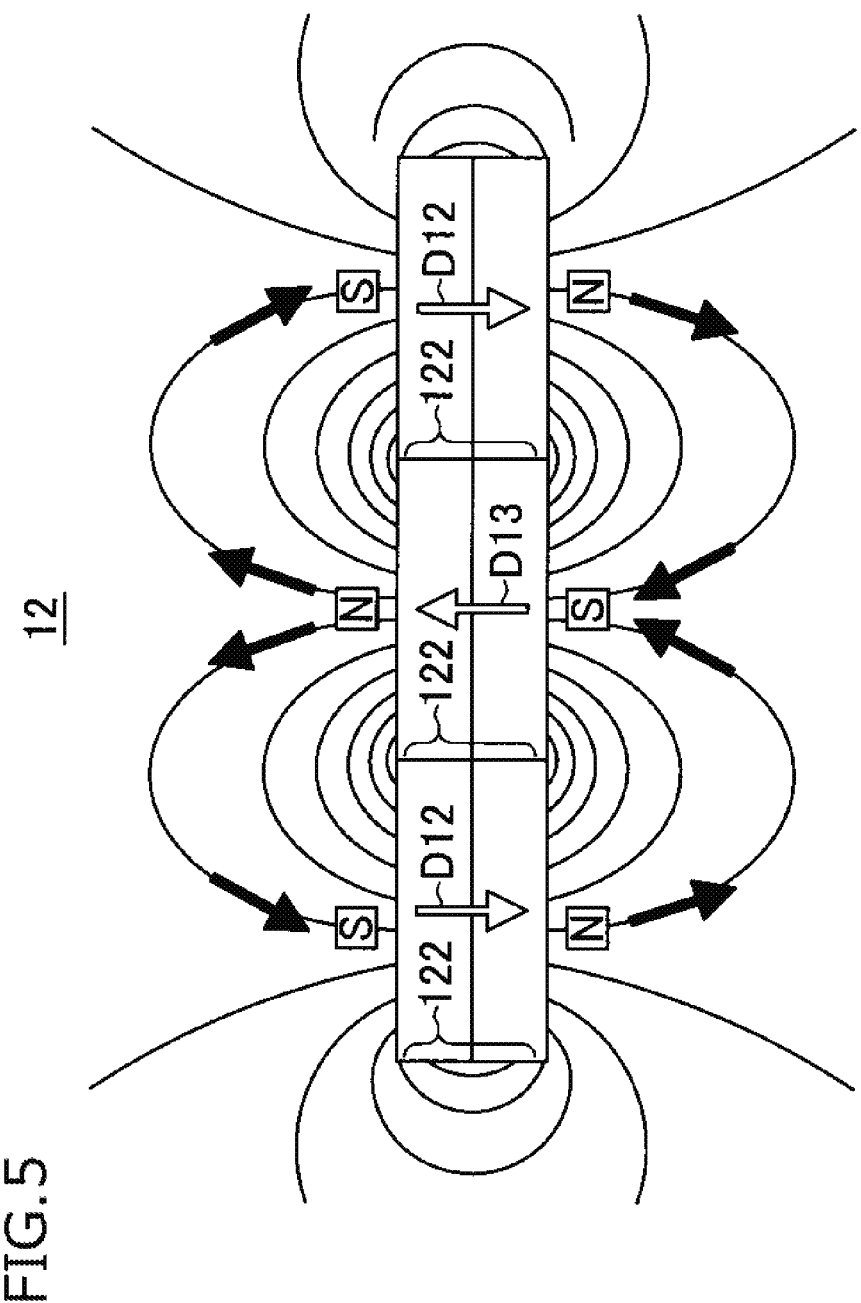
FIG. 5 is a schematic view for describing a case where an N-S array is employed as an array of a plurality of magnets in the mover illustrated in FIGS. 1 to 3.
Figure 6:
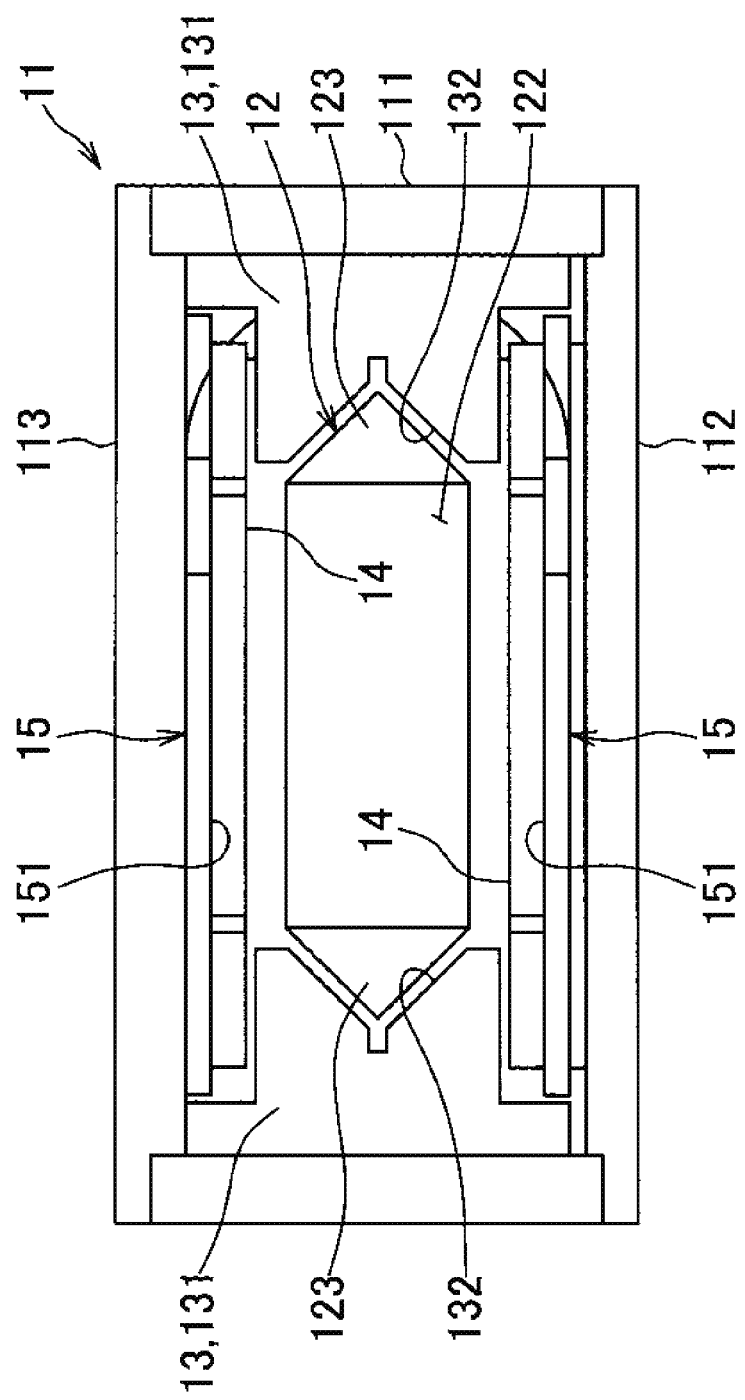
FIG. 6 is a cross-sectional view illustrating a cross-section taken along line V11-V11 in FIG. 1 of the linear vibration actuator illustrated in FIG. 1.

FIG. 5 is a schematic view for describing a case where the N-S array is employed as the array of the magnets in the mover illustrated in FIGS. 1 to 3. FIG. 6 is a cross-sectional view illustrating a cross-section taken along line V11-V11 in FIG. 1 of the linear vibration actuator illustrated in FIG. 1. In FIG. 6, the ceiling wall portion 113 and the coil holder 15, which are not illustrated in FIG. 1, are illustrated.

As illustrated in FIG. 5, in the N-S array, respective magnetizing directions D12 and D13 of the two magnets 122 adjacent to each other in the mover 12 are perpendicular to the pair of flat surfaces 151 (see FIG. 6) on which the planar coils 14 are arranged and are in opposite directions to each other. In the N-S array, N poles and S poles appear alternately on the surface of the mover 12 facing each flat surface 151. Then, in the mover 12 employing the N-S array, it is possible to obtain the magnetic force of substantially uniform magnitude that is toward each of the pair of flat surfaces 151. Therefore, it is easy to stabilize the position of the mover 12 in a direction intersecting the pair of flat surfaces 151 in the housing 11. Therefore, the mover 12 can be stably vibrated.

Figure 7:
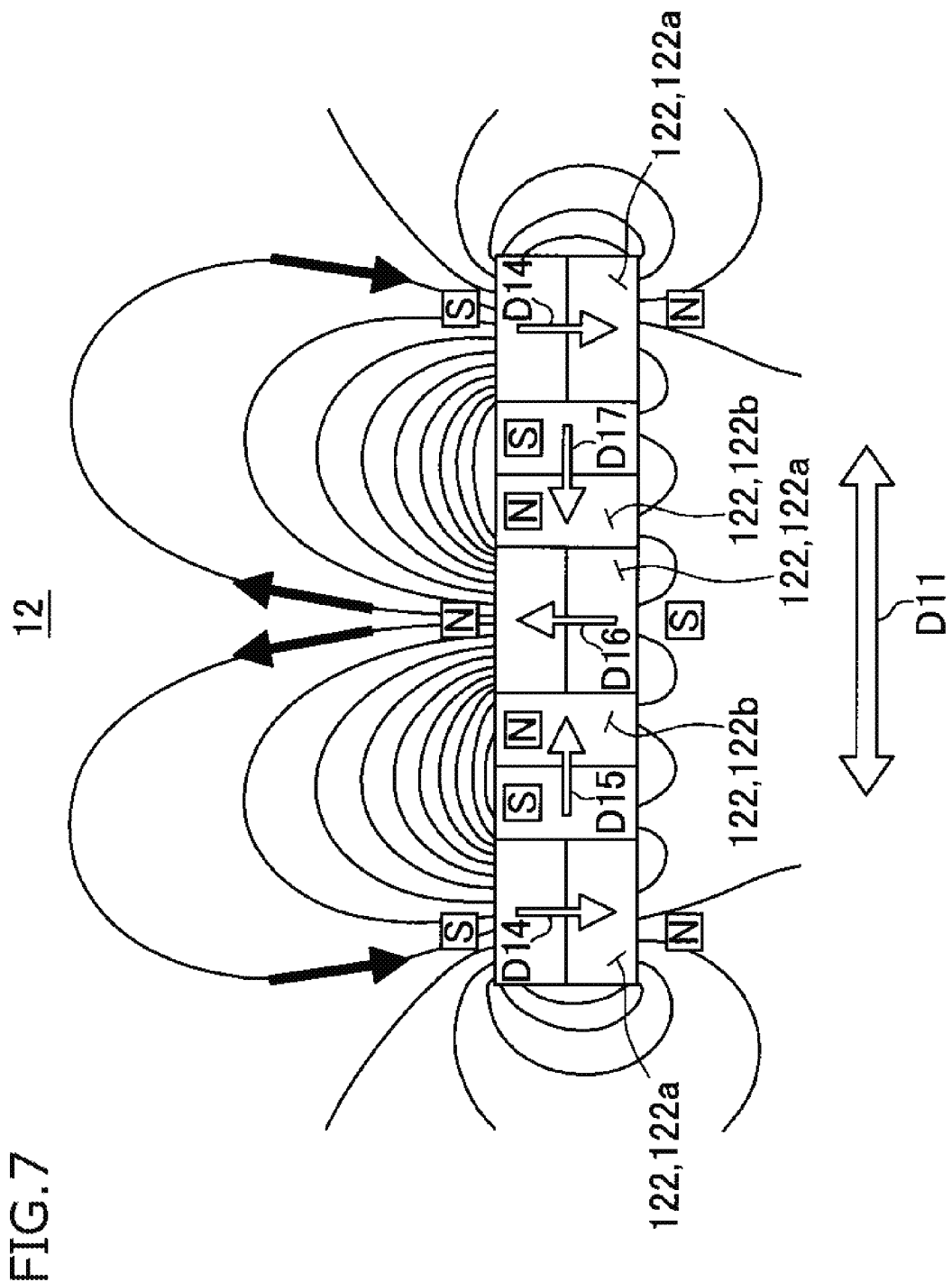
FIG. 7 is a schematic view for describing a case where a Halbach array is employed as the array of the magnets in the mover illustrated in FIGS. 1 to 3.

FIG. 7 is a schematic view for describing a case where the Halbach array is employed as the array of the magnets in the mover illustrated in FIGS. 1 to 3.

The Halbach array is a magnet array set so that the magnetic force in a desired direction is increased. The Halbach array of the present embodiment is the magnet array set so that the magnetic force on an upper side in FIG. 7, which is toward one of the pair of flat surfaces that are in the vibration direction D11 and sandwich the mover 12 therebetween, is increased. In order to increase the magnetic force in this way, in the Halbach array of the present embodiment, as illustrated in FIG. 7, the magnetizing directions D14, D15, D16 and D17 of two adjacent magnets 122 are directed as follows. That is, the magnetizing directions D14 and D16 of one magnet 122a are perpendicular to the flat surface 151 on which the planar coils 14 are arranged. The magnetizing directions D15 and D17 of the other magnet 122b are parallel to the vibration direction D11. In this way, magnetic poles of the magnets are arranged to rotate by 90°. With such a Halbach array, the magnetic force toward the upper side in FIG. 7 is increased around the mover 12. According to an example calculation, in the Halbach array mover 12 illustrated in FIG. 7, the magnetic force toward the upper side in FIG. 7, that is, surface magnetic flux density is increased by about 1.7 times in the same magnetic pole pitch as compared with the N-S array mover 12 illustrated in FIG. 5.

With the mover 12 employing the Halbach array as described above, the large driving force can be obtained from the planar coils 14 arranged on one flat surface 151 located in the direction of the increased magnetic force. Thus, the mover 12 can be vibrated more strongly. As a result, for example, by applying the mover 12 employing such a Halbach array to the vibration function of the smartphone or the like, certainty of notification to a user can be increased.

Here, when the mover 12 employing the Halbach array is used, as described above, the magnetic force toward an opposite side of the flat surface 151 located in the direction of the increased magnetic force is reduced. An arrangement of the planar coils 14 for generating the driving force depending on such bias of the magnetic force in the mover 12 may be an arrangement of the following modification different from that of the present embodiment illustrated in FIGS. 1, 2, and 6.

Figure 8:
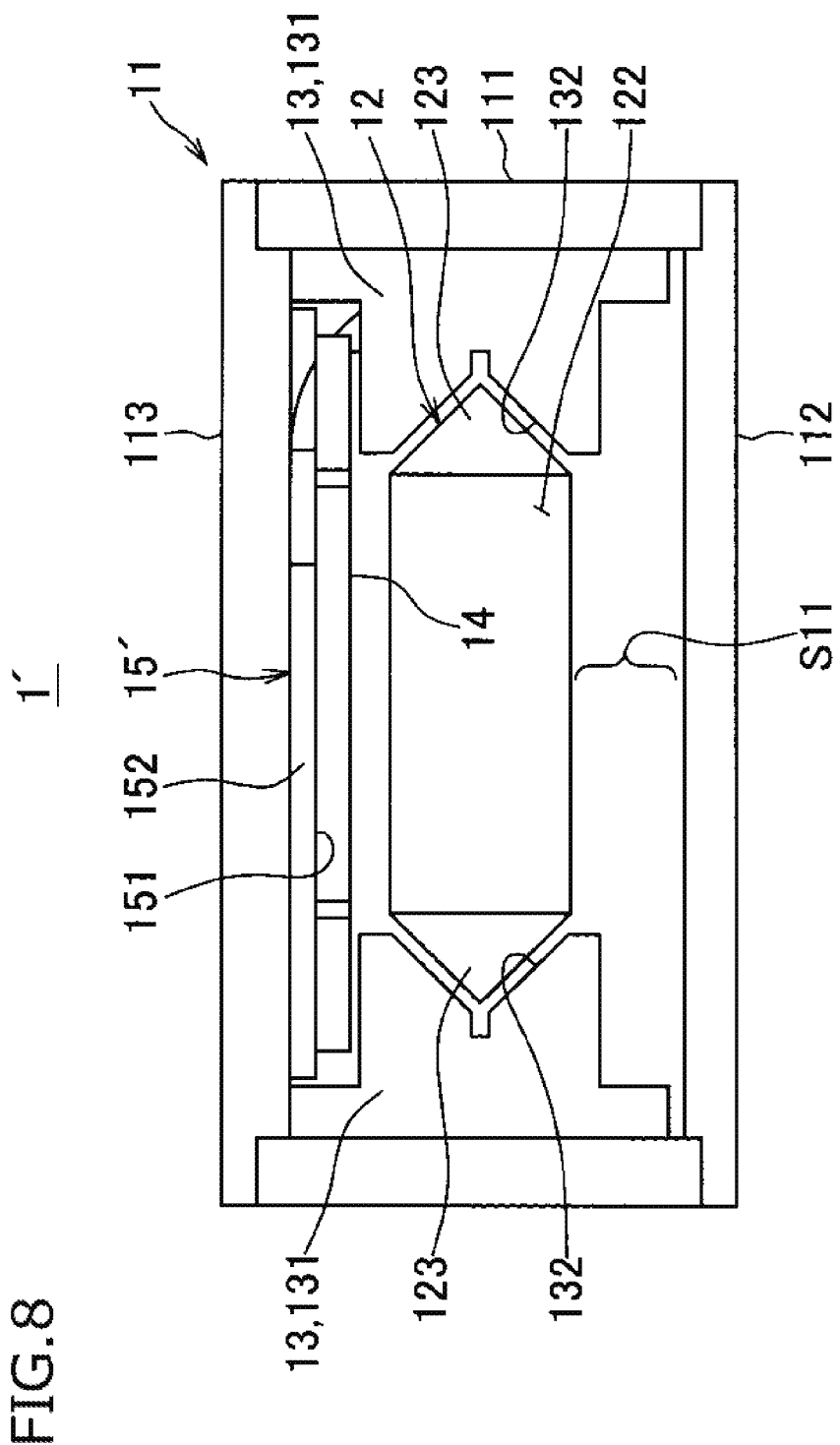
FIG. 8: is a view illustrating a modification of arrangement of the planar coils for the mover employing the Halbach array.

FIG. 8 is a view illustrating the modification of the arrangement of the planar coils for the mover employing the Halbach array.

In the linear vibration actuator 1' of the modification illustrated in FIG. 8, the planar coil 14 is wound only on the one flat surface 151 on the upper side in FIG. 8 located in the direction of the increased magnetic force. Even in such a modification, a sufficiently strong Lorentz force is generated between the increased magnetic force and the planar coils 14 arranged only on the one flat surface 151. Therefore, the mover 12 can be vibrated strongly. In the modification, the arrangement of the planar coils 14 on a side of the bottom wall portion 112 of the housing 11 is omitted. Accordingly, in the modification, the coil holder 15' has a shape having the rectangular plate portion 152 only on a side of the ceiling wall portion 113 on which the planar coils 14 are arranged.

In the linear vibration actuator 1' of the modification, an empty space S11 is formed on the side of the bottom wall portion 112 where the planar coils 14 are not arranged, in the housing 11. Thus, the linear vibration actuator 1' can be, for example, made thinner by an amount of the empty space S11. Alternatively, the empty space S11 can be, for example, used to dispose a weight for adjusting a weight of the mover 12.

Here, as described above, at least a part of the housing 11 is made of the magnetic material. This aims at confining the magnetic force from the mover 12 and the planar coils 14 inside the housing 11. As a result, an attractive force acts between the mover 12 having the magnets 122 and the housing 11. The mover 12 has the end edge 123 having the V-shaped cross-section fitted into the guide groove 132 having a V-shaped cross-section provided in the rail member 131 of the guide portion 13, so as to be held linearly movable in the vibration direction D11. At this time, when the mover 12 is attracted to either the bottom wall portion 112 or the ceiling wall portion 113 of the housing 11 by the above-described attractive force, the end edge 123 may contact the guide groove 132 with a large load. Such contact is a factor that hinders smooth vibration of the mover 12, and is desirably suppressed.

In the following, structures for suppressing contact between the end edge 123 of the mover 12 and the guide groove 132 will be described with three examples.

Figure 9:
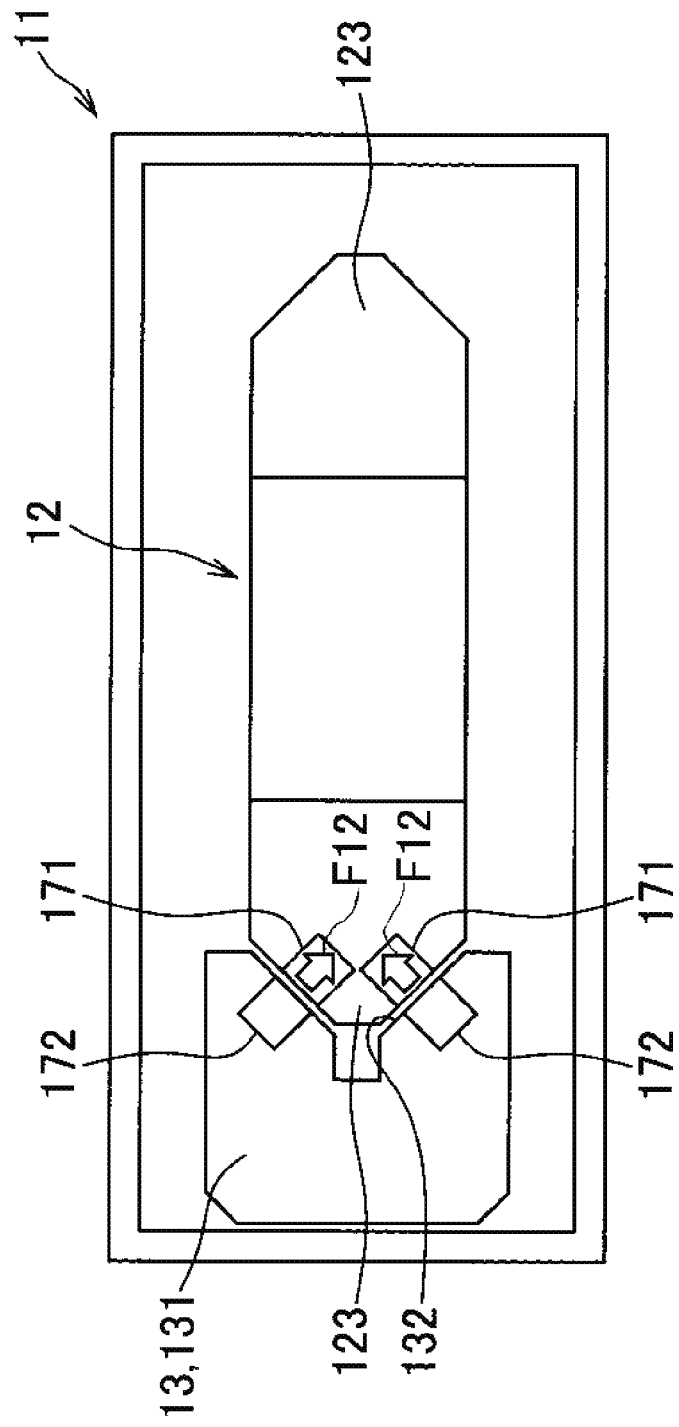
FIG. 9 is a schematic view illustrating a first structure for suppressing contact between an end edge of the mover and a guide groove.

FIG. 9 is a schematic view illustrating a first structure for suppressing contact between the end edge of the mover and the guide groove. In FIG. 9, the above-described first structure is illustrated by a schematic view in which the cross-sectional views illustrated in FIGS. 6 and 8 are simplified. Further, in this simplification, only one of the pair of rail members 131 in the guide portion 13 is illustrated.

In the first structure illustrated in FIG. 9, first floating magnets 171 are respectively arranged on the pair of end edges 123 of the mover 12. Second floating magnets 172 are respectively arranged in guide grooves 132 of the pair of rail members 131. The first floating magnets 171 are arranged at portions of each end edge 123 of the mover 12 respectively facing the pair of flat surfaces 151 of the coil holder 15. The second floating magnets 172 are arranged on the inner surface of each guide groove 132 so as to face the first floating magnets 171. The second floating magnet 172 has the same polarity as that of the first floating magnet 171. In the first structure, floating forces F12 are generated by repulsion of the two magnets. The floating force F12 are forces for separating the portions of each end edge 123 of the mover 12 respectively facing the pair of flat surfaces 151 of the coil holder 15 from the inner surfaces of the guide groove 132. By the floating forces F12, each end edge 123 of the mover 12 floats from the inner surface of the guide groove 132. This makes it possible to suppress the end edge 123 of the mover 12 from strongly contact the inner surface of the guide groove 132 even when the above-described attractive force acts. As a result, the mover 12 can be vibrated smoothly and linearly.

The first structure illustrated in FIG. 9 can be applied to the linear vibration actuator 1 employing the N-S array illustrated in FIGS. 5 and 6, and the linear vibration actuators 1' employing the Halbach array illustrated in FIGS. 7 and 8. Here, in the linear vibration actuator 1' employing the Halbach array, the magnetic force from the mover 12 is biased. Therefore, the attractive force acting between the mover 12 and the housing 11 is also biased. At this time, a distance between the end edge 123 of the mover 12 and the inner surface of the guide groove 132 is very short, and the floating force F12 due to the repulsion between the second floating magnet 172 and the first floating magnet 171 can be set so large that the bias of the attractive force can be ignored. Therefore, the first structure illustrated in FIG. 9 can also be applied to the linear vibration actuator 1' employing the Halbach array.

Figure 10:
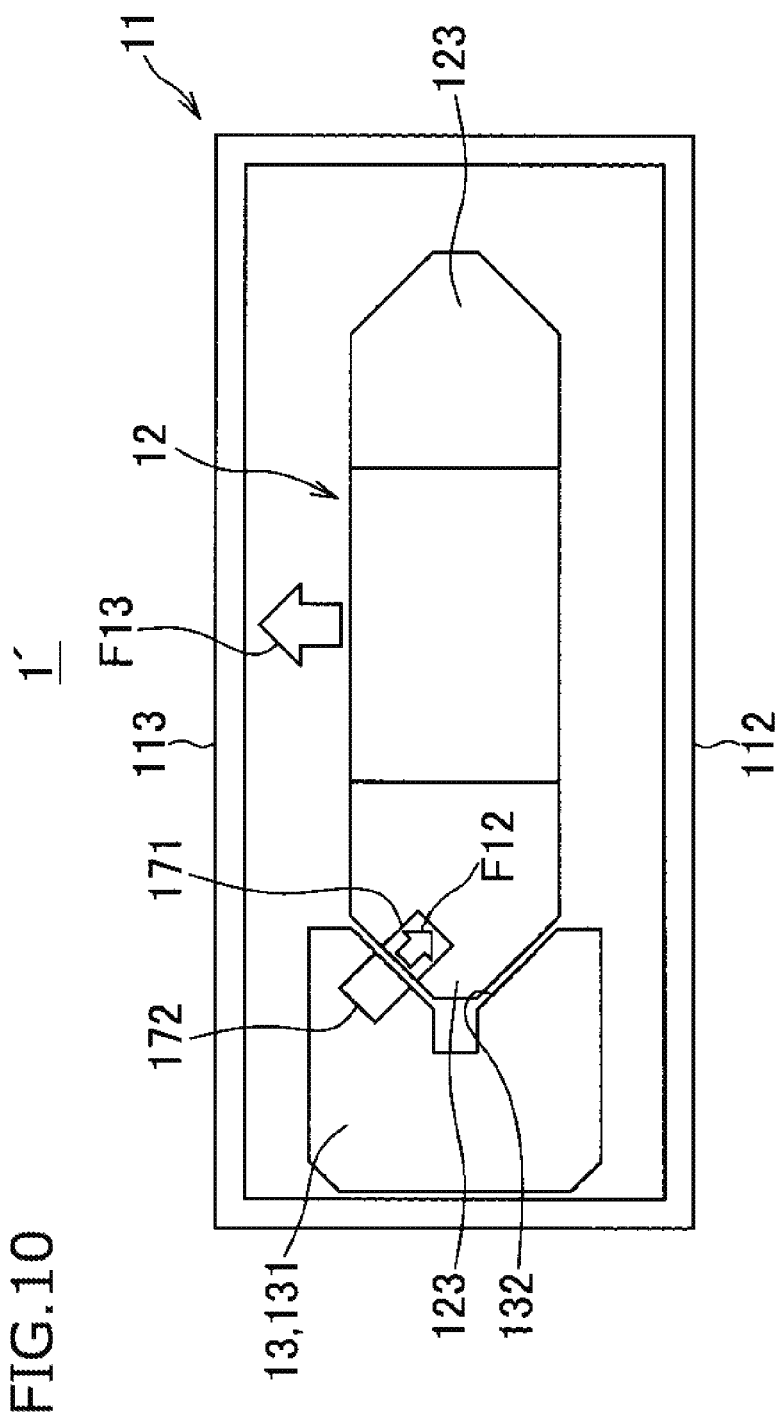
FIG. 10 is a schematic view illustrating a second structure for suppressing contact between the end edge of the mover and the guide groove.

FIG. 10 is a schematic view illustrating a second structure for suppressing contact between the end edge of the mover and the guide groove. In FIG. 10, the above-mentioned second structure is illustrated by a schematic view obtained by simplifying the cross-sectional view illustrated in FIG. 8. Also, in this simplification, only one of the pair of rail members 131 in the guide portion 13 is illustrated.

The second structure illustrated in FIG. 10 is a structure that is supposed to be applied to the linear vibration actuator 1' employing the Halbach array illustrated in FIGS. 7 and 8. In the linear vibration actuator 1', the attractive force acting between the mover 12 and the housing 11 is biased as described above. In this example, an attractive force F13 from the mover 12 toward the ceiling wall portion 113 increases. The second structure is a structure based on such a bias of the attractive force.

In the second structure, the first floating magnet 171 is disposed only in a portion of the end edge 123 of the mover 12 facing the ceiling wall portion 113 where a strong attractive force F13 acts. Then, the second floating magnet 172 is disposed only on a portion of the inner surface of the guide groove 132 facing the first floating magnet 171 on a side of the ceiling wall portion 113. At this time, the floating force F12 due to the repulsion between the second floating magnet 172 and the first floating magnet 171 is set to a magnitude that can restrain the floating force F12 from being too much larger than the attractive force F13 and can restrain the end edge 123 from strongly contacting the inner surface of the guide groove 132 on the side of the bottom wall portion 112.

With the second structure described above, the manufacturing cost can be reduced by reducing the number of magnets used. Further, by floating the end edge 123 of the mover 12 from the inner surface of the guide groove 132, the mover 12 can be vibrated smoothly and linearly.

Figure 11:
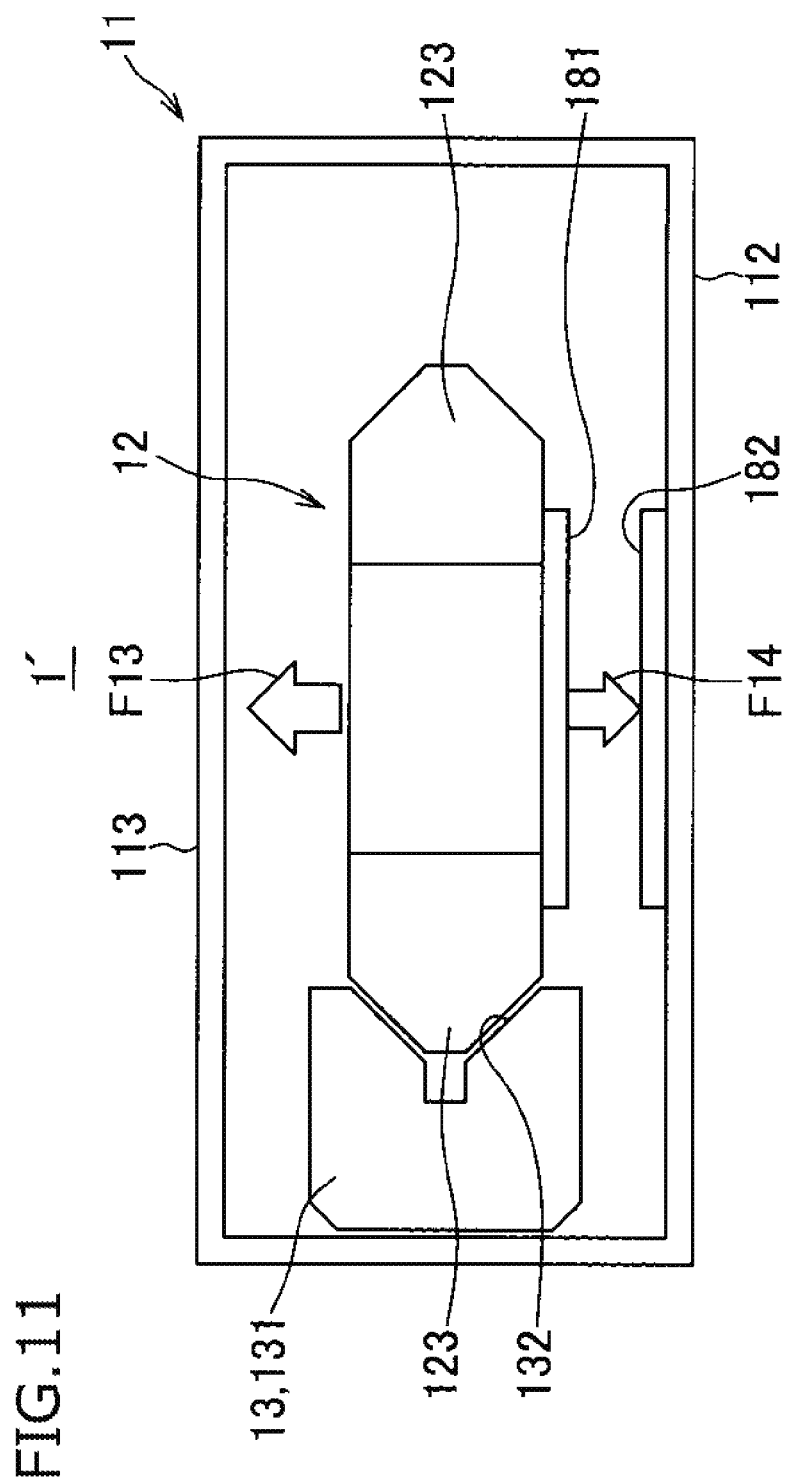
FIG. 11 is a schematic view illustrating a third structure for suppressing contact between the end edge of the mover and the guide groove.

FIG. 11 is a schematic view illustrating a third structure for suppressing the contact between the end edge of the mover and the guide groove. In FIG. 11, the above-described third structure is illustrated by a schematic view obtained by simplifying the cross-sectional view illustrated in FIG. 8. Also, in this simplification, only one of the pair of rail members 131 in the guide portion 13 is illustrated.

The third structure illustrated in FIG. 11 is also the structure that is supposed to be applied to the linear vibration actuator 1' employing the Halbach array illustrated in FIGS. 7 and 8 as with the second structure illustrated in FIG. 10. That is, this third structure is also the structure based on the bias of the attractive force in which the attractive force F13 from the mover 12 toward the ceiling wall portion 113 of the housing 11 increases.

In the third structure, the space S11 (see FIG. 8) which is provided on the side of the bottom wall portion 112 as viewed from the mover 12 and which is empty by not mounting the planar coil 14 is utilized. In the third structure, a first floating member 181 is disposed on the surface of the mover 12 opposite to the flat surface 151 on which the planar coils 14 are arranged and facing the bottom wall portion 112. The first floating member 181 also serves as the weight for adjusting the weight of the mover 12. Then, the second floating member 182 is disposed on the bottom wall portion 112 facing the first floating member 181 on the inner surface of the housing 11. The first floating member 181 and the second floating member 182 are attracted to each other by their combination, so that the end edge 123 of the mover 12 is floated from the inner surface of the guide groove 132. Then, the combination of the first floating member 181 and the second floating member 182 is, for example, the magnets, the magnet and the magnetic body, or the magnetic body and the magnet, which have mutually the opposite polarities.

If the space S11 has more room, another weight member may be disposed integrally with the mover between the mover 12 and the first floating member 181. As the material of the weight member, the material having a high specific gravity such as tungsten is suitable. Larger vibration energy can be obtained by increasing mass of a vibrating body including the mover 12.

If a need to increase the vibration energy by increasing the weight is small and the space S11 has more room, the vibration actuator can be made thinner and smaller.

In the third structure described above, an attractive force F14 acts between the first floating member 181 and the second floating member 182 in the linear vibration actuator 1'. The attractive force F14 between the first floating member 181 and the second floating member 182 is, as described above, a force opposite to the attractive force F13 from the mover 12 toward the ceiling wall portion 113. Then, in the third structure, the attractive force F14 between the first floating member 181 and the second floating member 182 is set to be balanced with the attractive force F13 from the mover 12 toward the ceiling wall portion 113. Thus, the manufacturing cost can be reduced by reducing the number of magnets used. Further, by floating the end edge 123 of the mover 12 from the inner surface of the guide groove 132, the mover 12 can be vibrated smoothly and linearly.

This is the end of description of the three structures for floating the end edge 123 of the mover 12 from the inner surface of the guide groove 132. Next, a modification of the mover itself will be described.

Figure 12:
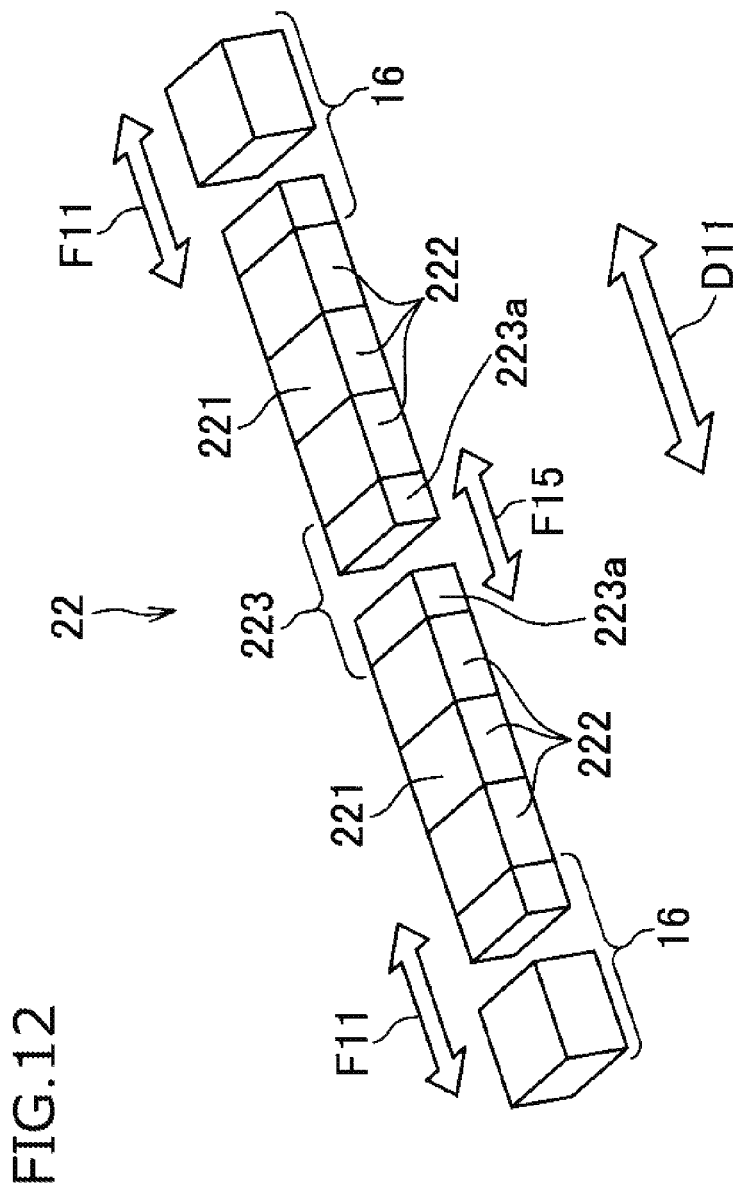
FIG. 12 illustrates a modification of the mover illustrated in FIGS. 1 to 3 in the schematic view like FIG. 3.

FIG. 12 illustrates a modification of the mover illustrated in FIGS. 1 to 3 in the schematic view like FIG. 3.

A mover 22 of the modification has two mover portions 221 arranged in the vibration direction D11 and adjacent to each other being elastically connected. Each mover portion 221 has a plurality of magnets 222 arranged therein. As the array of the magnets 222, either of the N-S array and the Halbach array described above can be employed. The abovementioned magnetic springs 16 are arranged at the both ends of the mover 22 having the two mover portions 221. In the mover 22 of the modification, the two mover portions 221 are elastically connected through a magnetic spring 223 like the magnetic spring 16 at the end. The magnetic spring 223 also includes two biasing magnets 223a having the same polarities and facing each other, and a repulsive force F15 is generated between the two biasing magnets 223a. End edges of the two mover portions 221 are held by rail members (not shown). The two mover portions 221 are biased in directions toward each other by the repulsive force F11 of the magnetic springs 16 at the both ends of the mover 22. In the mover 22 of the modification, the two mover portions 221 are elastically connected to each other by holding by the rail members (not shown), biasing by the magnetic springs 16 at the both ends, and repulsive biasing by the central magnetic spring 223.

Here, the mover 22 of the modification has the two mover portions 221 that are elastically connected to each other. From this, as described below, the mover 22 of the modification has the vibration characteristics having two resonance frequencies.

Figure 13:
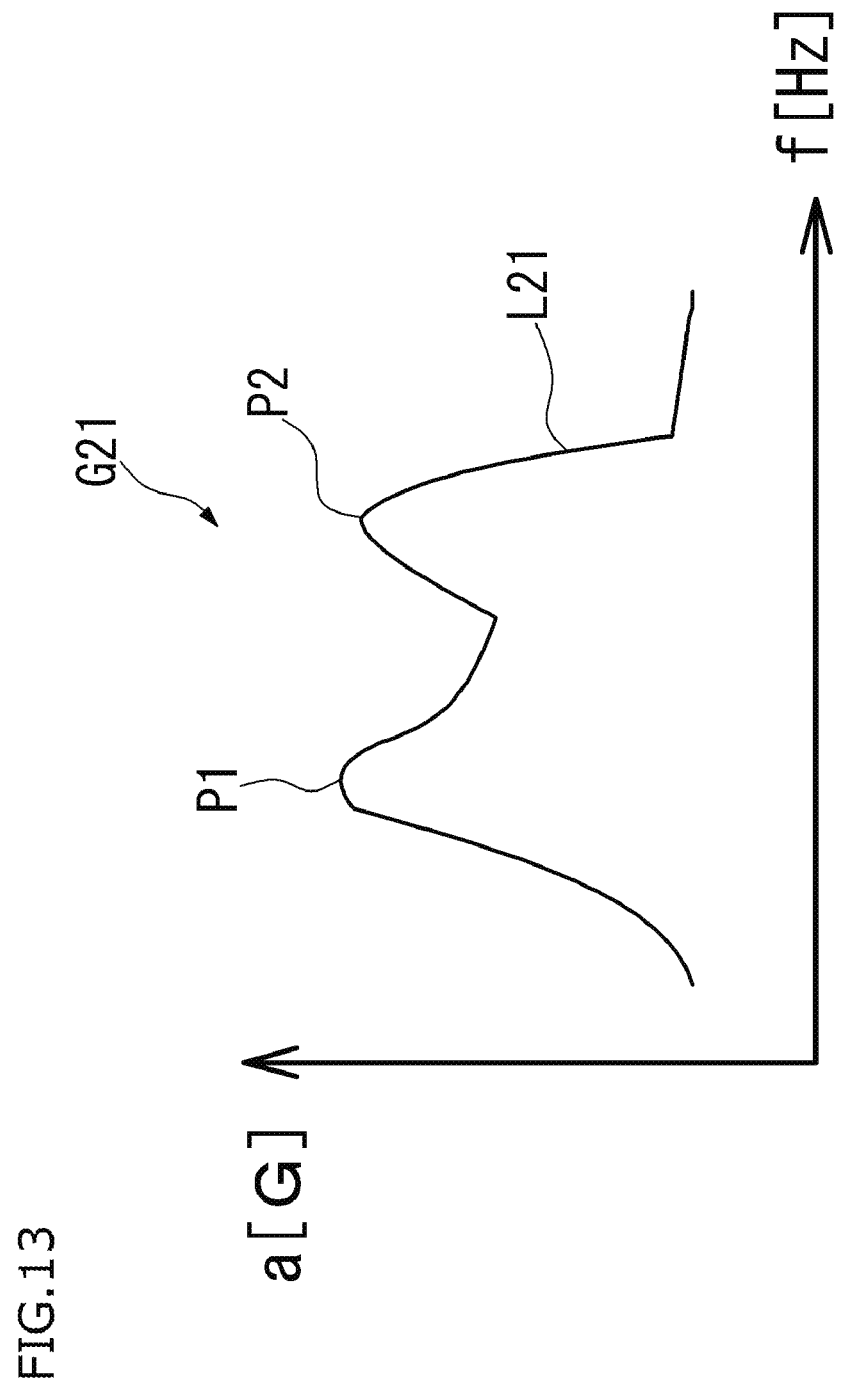
FIG. 13 is a graph illustrating vibration characteristics that the mover illustrated in FIG. 12 has.

FIG. 13 is a graph illustrating the vibration characteristics that the mover illustrated in FIG. 12 has. This graph illustrates the vibration characteristics when the two mover portions 221 have the same mass and the magnetic spring 16 also has the same mass. In a graph G21 illustrated in FIG. 13, a vertical axis represents the acceleration a [G=9.8 m/s$^2$] generated when the mover 22 vibrates, while a horizontal axis represents a vibration frequency f [Hz]. The vibration characteristics of the mover 22 is illustrated by a change curve L21 of the acceleration a during vibration with respect to the vibration frequency f.

Here, in the mover 22 illustrated in FIG. 12, biasing of the both ends and elastic connection of the two mover portions 221 are respectively performed by the magnetic springs 16 and 223. On the other hand, the graph G21 illustrated in FIG. 13 illustrates the vibration characteristics of the mover 22 when the magnetic springs 16 and 223 in the mover 22 illustrated in FIG. 12 are replaced with linear springs such as a coil spring or a leaf spring. This is because resonance having a steep peak does not appear in a configuration having the magnetic springs 16 and 223 that are nonlinear springs. Here, in order to clearly show appearance of two resonances by providing the two mover portions 221, the springs are replaced as described above. Here, as an example, two magnetic springs 16 having the same mass and the same spring constant as the mover portions 221 are used. In this regard, the resonance frequency can be increased by employing two magnetic springs 16 having different masses and/or different spring constants from the mover portions 221. As a result, vibration in a wide band can be realized.

As illustrated by the change curve L21 in the graph G21 of FIG. 13, the two resonances appear by providing the two mover portions 221. Two resonance peaks P1 and P2 drawn by the change curve L21 are both steep because the linear springs are used as described above. In fact, since the magnetic springs 16 and 223 are used, each resonance frequency has a wide band frequency. That is, with the mover 22 of the modification illustrated in FIG. 12, the two resonance frequencies are generated and each resonance frequency is a wide band frequency, so that a wide band can be obtained in which the vibration intensity not less than a certain level can be obtained. This allows the mover 22 to vibrate at a vibration frequency having a width within such a wide band range.

EXAMPLE 2

Figure 14:
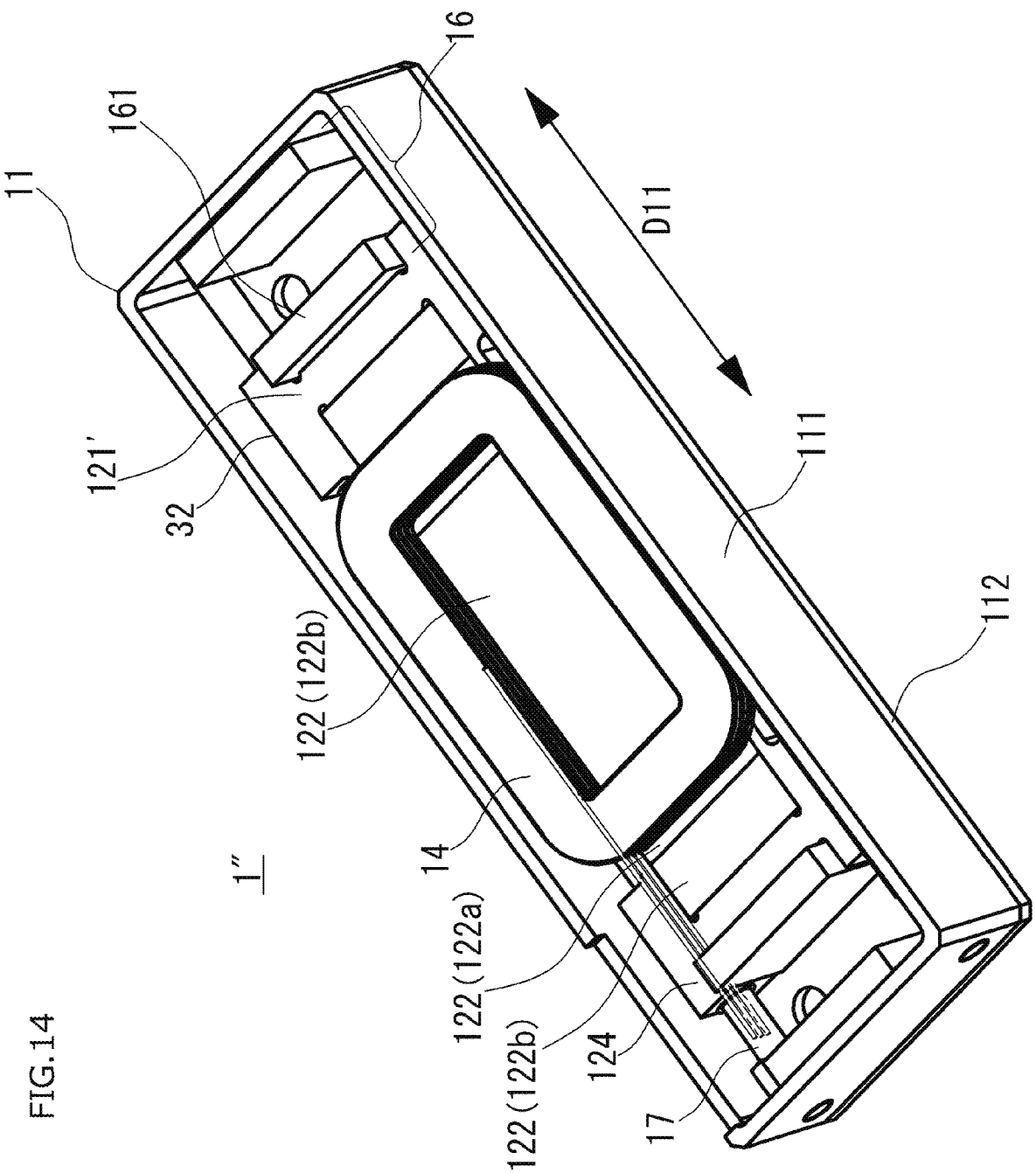
FIG. 14 illustrates another linear vibration actuator according to the embodiment of the present disclosure.
Figure 15:
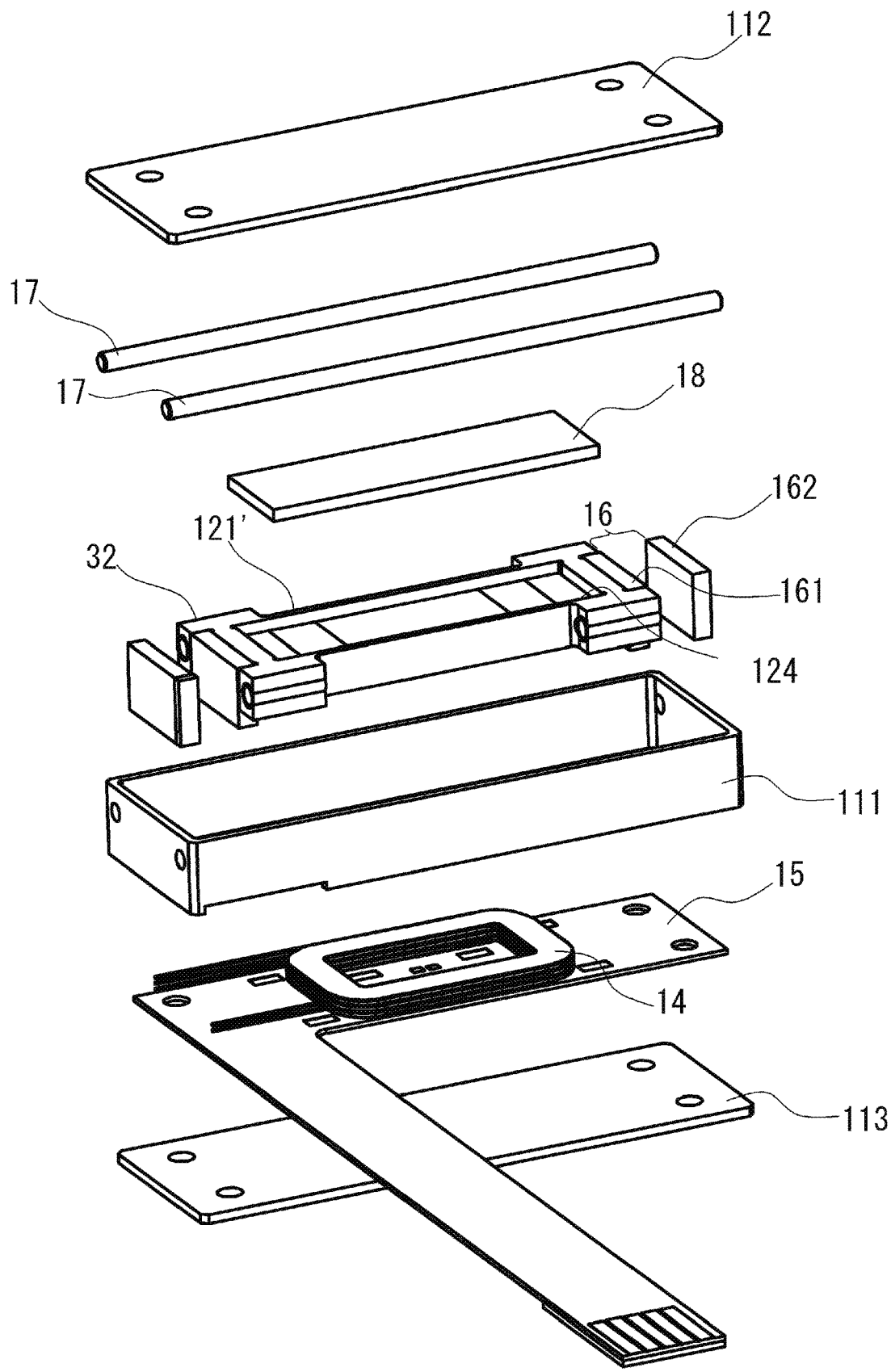
FIG. 15 is an exploded perspective view of the linear vibration actuator illustrated in FIG. 14.

FIG. 14 illustrates a linear vibration actuator 1" according to the present example. FIG. 15 is an exploded perspective view of the linear vibration actuator 1".

Figure 16:
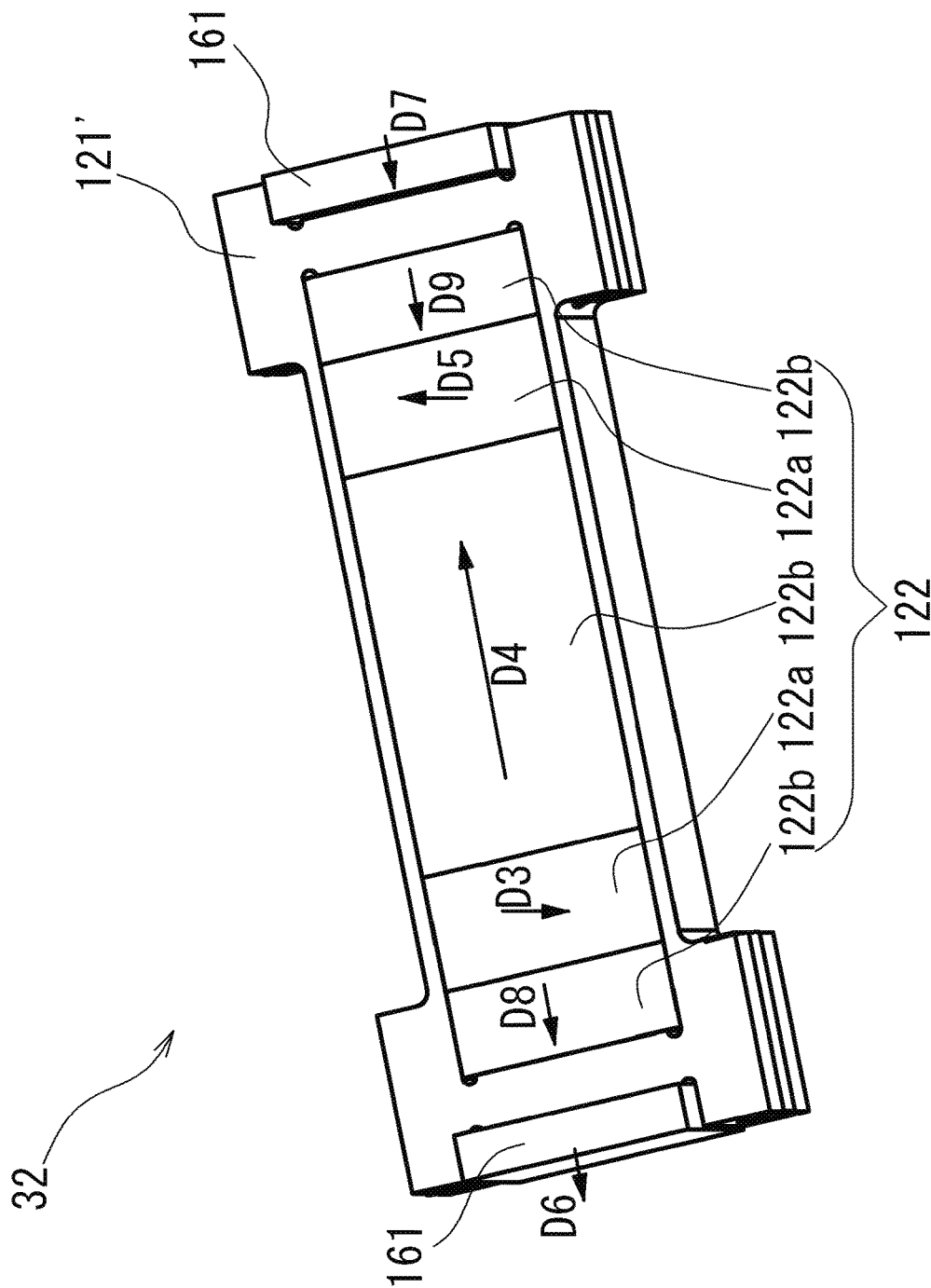
FIG. 16 is a view illustrating directions of magnetic poles of the magnets of the mover employing the Halbach array.
Figure 17:
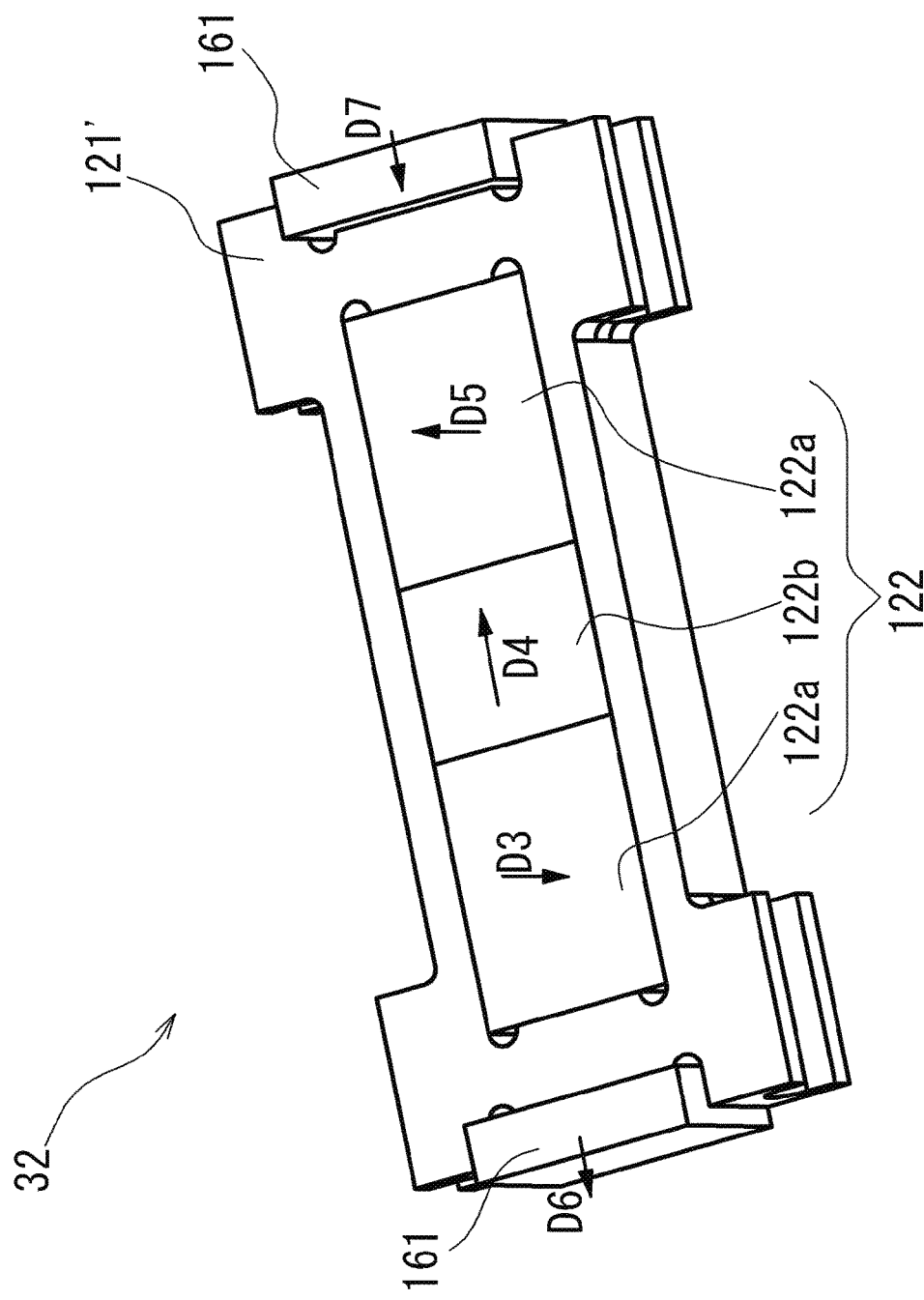
FIG. 17 is a view illustrating the directions of the magnetic poles of the magnets of the mover when first biasing magnets form a part of the Halbach array.
Figure 18A:
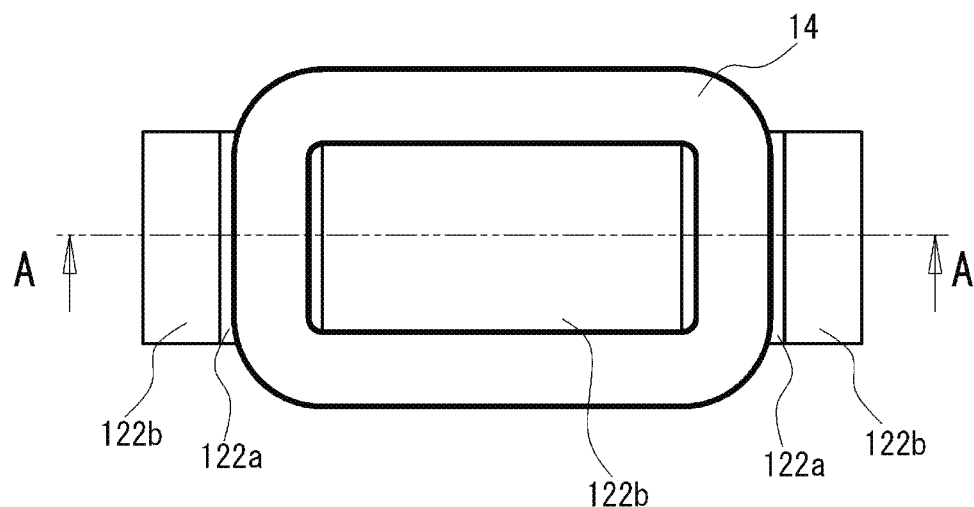
FIGS. 18A and 18B are cross-sectional views illustrating a relationship between a width of the coil and a width of the magnet, and an air gap between the magnet and the coil for the linear vibration actuator illustrated in FIG. 14.
Figure 18B:
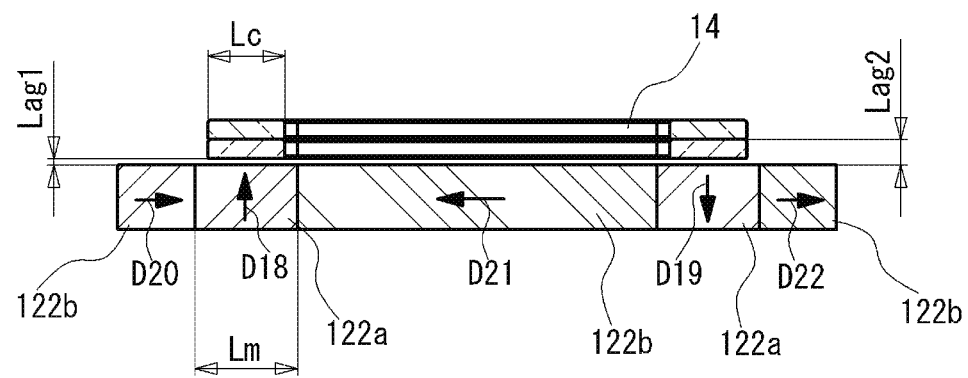

FIGS. 16 and 17 illustrate a configuration example of the mover applied to the linear vibration actuator 1" together with directions of the magnetic poles. FIGS. 18A and 18B illustrate the planar coil 14 and the magnet 122 of a mover 32 of the linear vibration actuator 1". FIG. 18A is a plan view thereof. FIG. 18B is a cross-sectional view illustrating a cross-section taken along line A-A shown in FIG. 18A.

The linear vibration actuator 1" causes the mover 32 to linearly vibrate in the same vibration direction D11 as in Example 1. The linear vibration actuator 1" includes the housing 11, the mover 32, a guide shaft 17, a back yoke 18, the planar coil 14, the coil holder 15, and the pair of magnetic springs 16.

The housing 11 is the rectangular parallelepiped box extending in the vibration direction D11. At least a part of the housing 11 is made of the magnetic material. The housing 11 includes the peripheral wall portion 111, the bottom wall portion 112, and the ceiling wall portion 113. In FIG. 14, the ceiling wall portion 113 and the coil holder 15 are not illustrated so that the internal structure of the linear vibration actuator 1" can be seen.

The mover 32 is a rectangular parallelepiped member housed in the housing 11 and extending in the vibration direction D11. The mover 32 includes an outer frame portion 121' and a plurality of magnets 122. The magnets 122 are fitted in the outer frame portion 121' in the state of being linearly arrayed in the vibration direction D11. The array of the magnets 122 will be described in detail below. The outer frame portion 121' is a rectangular frame that houses the magnets 122 therein. Further, at both ends of the outer frame portion 121' in the vibration direction D11, recesses for fixing the first biasing magnet 161 to a center of the mover 32 with high accuracy are provided.

Each of a pair of holders 124 provided in the vibration direction D11 in the outer frame portion 121' is slidable with the guide shaft 17 and slidably hold the guide shaft 17. A total length of the outer frame portion 121' in the vibration direction D11 is not necessarily the same as that of the holder 124. As illustrated in FIG. 15, a central portion of the outer frame portion 121' may be cut off.

The material of the outer frame portion 121' is not particularly limited. The material of the outer frame portion 121' may be satisfactorily selected to obtain a weight necessary for appropriately designing the resonance frequency of the mover 32. For example, the material of the outer frame portion 121' may be a resin slidable well with the guide shaft 17, or a metal having a high specific gravity such as tungsten in order to obtain a vibration force.

The guide shaft 17 has a columnar shape. The guide shaft 17 is housed in the housing 11 by being inserted into holes provided at both ends of the housing 11 in the vibration direction D11. The guide shaft 17 cooperates with the holder 124 to hold the mover 32 linearly movable in the vibration direction D11. That is, the guide shaft 17 slidably holds the mover 12. The material of the guide shaft 17 is preferably the non-magnetic material such as SUS304 of austenitic stainless in order to suppress generation of resistance due to the magnetic attraction with the magnet 122 of the mover 12.

In FIG. 15, a shape of cross-section of the holder 124 perpendicular to the vibration direction D11 is drawn as a recessed U-shape. The shape of the cross-section is not limited to this, and may be, for example, circular.

In order to improve sliding of the mover 32, a sleeve-shaped component may be interposed between the holder 124 and the guide shaft 17. The material of the sleeve-shaped component is preferably brass or resin such as PEEK and POM when combined with the guide shaft 17 made of SUS304.

Operations of the planar coil 14, and the biasing magnets 161 and 162 constituting the magnetic spring 16 are the same as those in Example 1, and thus their description will be omitted. On the other hand, the array of the magnets 122 cooperating with the planar coil 14 to generate the driving force in the mover 32 may be the N-S array or the Halbach array. By employing the Halbach array, the magnetic flux density interlinked to the planar coil 14 is increased, so that the driving force can be increased.

The magnets 122 forming the Halbach array housed in the outer frame portion 121' may have a magnetic pole array as shown by D3 to D9 in FIG. 16, as with the magnet 122 described in Example 1. Alternatively, as illustrated in FIG. 17, magnets 122b at the both ends of the Halbach array may be omitted. In this case, the first biasing magnet 161 also serves as the magnet 122b. Therefore, even if the total number of magnets used in the mover is reduced, the magnetic flux density interlinked to the coil can be increased.

In order to increase the surface magnetic flux density of the Halbach array magnet, it is preferable to set the directions of the magnetic poles of the first biasing magnets 161 at the both ends to be the same when the number of the magnets 122a is an even number, and it is preferable to set the directions of the magnetic poles of the first biasing magnets 161 at the both ends to be opposite to each other when the number of the magnets 122a is an odd number. In this case, the distance between the magnet 122a and the first biasing magnet 161 may be satisfactorily set so that the driving force and the biasing force are optimized.

The linear vibration actuator 1" described above has the following features.

The outer frame portion 121' has a shape capable of highly accurately positioning the first biasing magnet 161 and the magnet 122 at the center of the mover 32. Therefore, magnetic flux density distribution on a surface of the first biasing magnet 161 is symmetrical in a direction perpendicular to the vibration direction of the mover 32. Further, the guide shaft 17 and the holding portion 124 cooperate with each other to form the guide portion, so that the mover 32 can be easily held at a center of the housing 11. Therefore, it is easy to assemble the linear vibration actuator 1" such that centers of the first biasing magnet 161 and the second biasing magnet 162 constituting the magnetic spring are aligned with each other. Thus, high acceleration can be obtained.

By forming the guide portion to include the guide shaft 17, it is easy to form a sliding surface having a smooth surface at low cost, and the high acceleration can be obtained.

The first biasing magnet 161 also serves as the magnets 122b at both ends of the driving magnet 122 constituting the Halbach array, so that the number of magnets used can be reduced and the linear vibration actuator can be provided at low cost. Further, the material having a high specific gravity such as tungsten is disposed instead of an omitted magnet, so that a larger acceleration can be obtained. Alternatively, by making the mover smaller, it is possible to provide a smaller linear vibration actuator.

Like a positional relationship between the planar coil 14 and the magnets 122 illustrated in FIGS. 18A and 18B, a width Lc of the winding in the vibration direction of the planar coil 14 may be equal to or less than a length Lm in the vibration direction of the one magnet 122a constituting the Halbach array. Thus, even if the mover moves from the midpoint by driving of the actuator, more magnetic flux is interlinked to the coil. Therefore, the larger thrust can be generated in the mover in a longer section during one cycle of the vibration.

EXAMPLE 3

Figure 19:
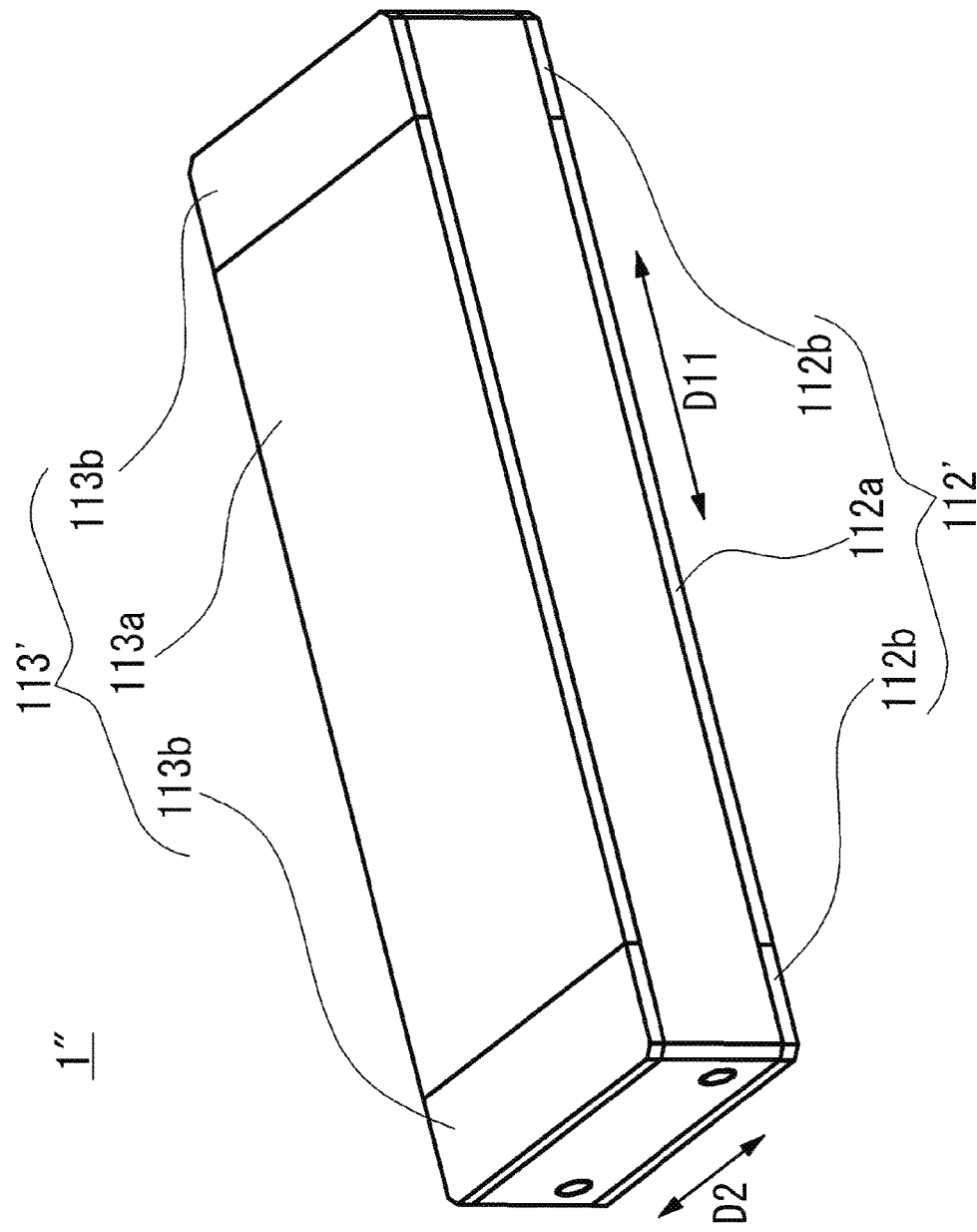
FIG. 19 illustrates the linear vibration actuator illustrated in FIGS. 14 and 15, in which a bottom wall portion and a ceiling wall portion are respectively divided into three.
Figure 20:
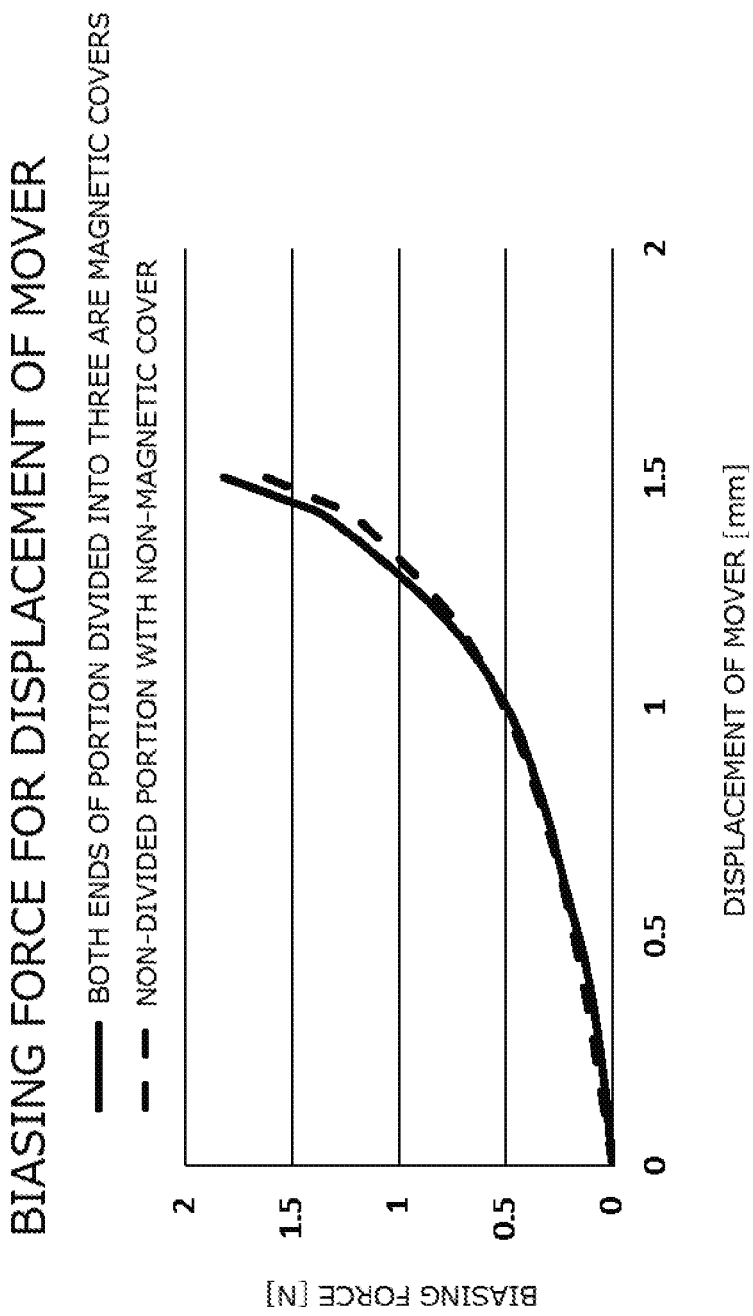
FIG. 20 is a graph illustrating a biasing force for displacement of the mover when both ends of the bottom wall portion and the ceiling wall portion, which are divided into three, in the linear vibration actuator illustrated in FIG. 19 are made of a magnetic material or a non-magnetic material.
Figure 21:
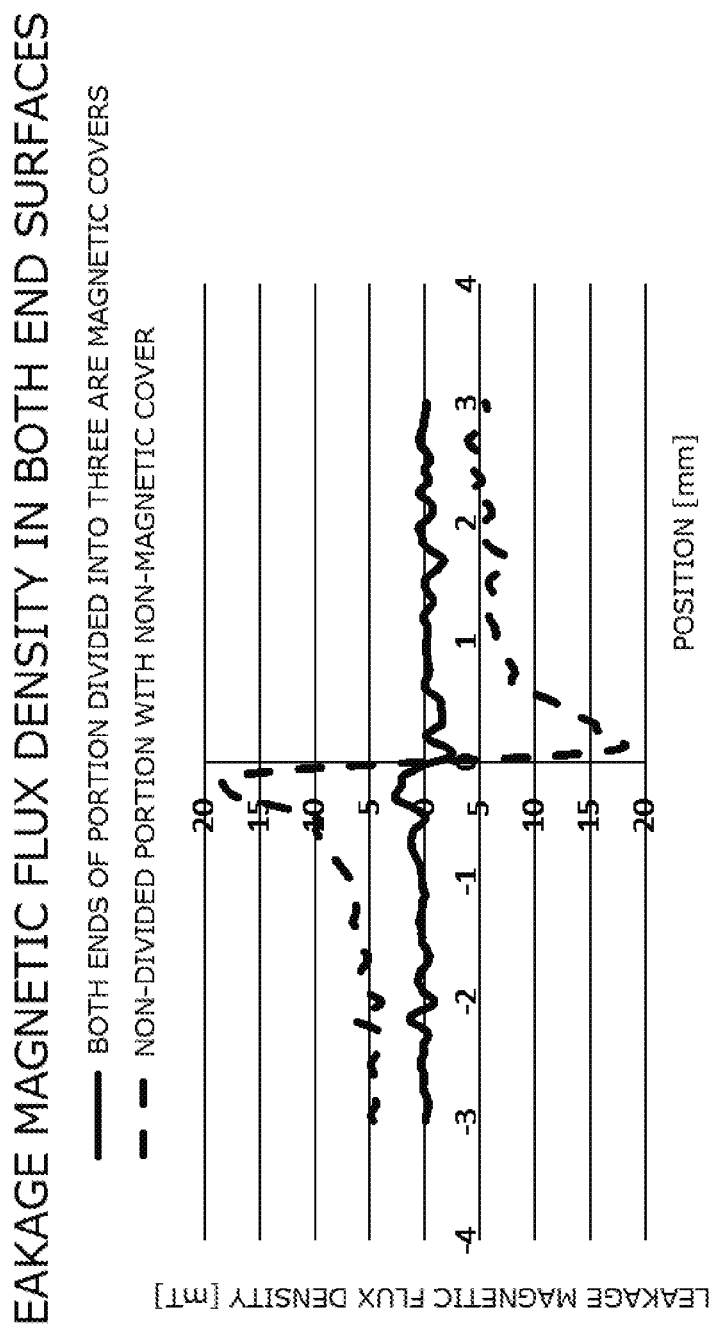
FIG. 21 is a graph illustrating leakage magnetic flux density distribution in both end surfaces in a vibration direction, when the both ends of the bottom wall portion and the ceiling wall portion, which are divided into three, in the linear vibration actuator illustrated in FIG. 19 are made of the magnetic material or the non-magnetic material.

Example 3 will be described mainly with reference to FIGS. 19 to 21. The linear vibration actuator of the present example basically has the same configuration as that of Example 2. In the linear vibration actuator of the present example, each of the bottom wall portion and the ceiling wall portion is divided. FIG. 19 is an external perspective view of the linear vibration actuator of the present example. FIG. 20 is a graph illustrating the biasing force for displacement of the mover in the linear vibration actuator of the present example. Similarly, FIG. 21 is a graph illustrating leakage magnetic flux density distribution in both end surfaces in the vibration direction.

As illustrated in FIG. 19, a peripheral wall portion 111' is made of the soft magnetic material. A bottom wall portion 112' and a ceiling wall portion 113' are each divided into three. By forming a central portion 112a of the bottom wall portion 112' and a central portion 113a of the ceiling wall portion 113' from the non-magnetic material such as SUS304 of the austenitic stainless steel, it is possible to suppress reduction of the driving force due to the magnetic attraction between the bottom wall portion 112' or the ceiling wall portion 113' and the driving magnet.

Out of portions divided into three of the bottom wall portion 112' and the ceiling wall portion 113', both end portions 112b and 113b in the vibration direction D11 preferably include the soft magnetic material in order to suppress the leakage magnetic flux from the magnetic spring. Thus, the surface magnetic flux density of the biasing magnets 161 and 162 constituting the magnetic spring 16 is increased, so that the larger biasing force can be obtained. Further, it is possible to suppress the collision between the magnets. In this case, a length of the soft magnetic material in the vibration direction is preferably greater than or equal to the length of the first biasing magnet 161, and smaller than or equal to a total of the length of the first biasing magnet 161 and the length of the second biasing magnet 162.

In the linear vibration actuator described above, it is possible to suppress the reduction of the driving force due to the magnetic attraction between the bottom wall portion 112' or the ceiling wall portion 113' and the driving magnet, thereby obtaining the high acceleration.

Further, since the leakage magnetic flux from the magnetic spring is suppressed, the surface magnetic flux density of the biasing magnets 161 and 162 constituting the magnetic spring 16 is increased. As a result, as illustrated in FIG. 20, the larger biasing force can be obtained, so that the high acceleration can be obtained. Further, the repulsive force between the first biasing magnet 161 and the second biasing magnet 162 is increased. Therefore, even if the mover 32 largely vibrates unintentionally by dropping or the like, it is easy to restrain the first biasing magnet 161 and the second biasing magnet 162 from colliding with each other to be destroyed. Therefore, it is also possible to extend the life of the device.

As illustrated in FIG. 21, it is further possible to reduce the leakage magnetic flux density when scanning in a D2 direction at a center of the both end surfaces in the vibration direction of the linear vibration actuator and at a location 0.1 mm away from the housing. Therefore, when the linear vibration actuator is incorporated in a thin electronic device such as the smartphone, it is possible to reduce adverse effects of the leakage magnetic flux from the peripheral wall portion on peripheral components.

EXAMPLE 4

Figure 22:
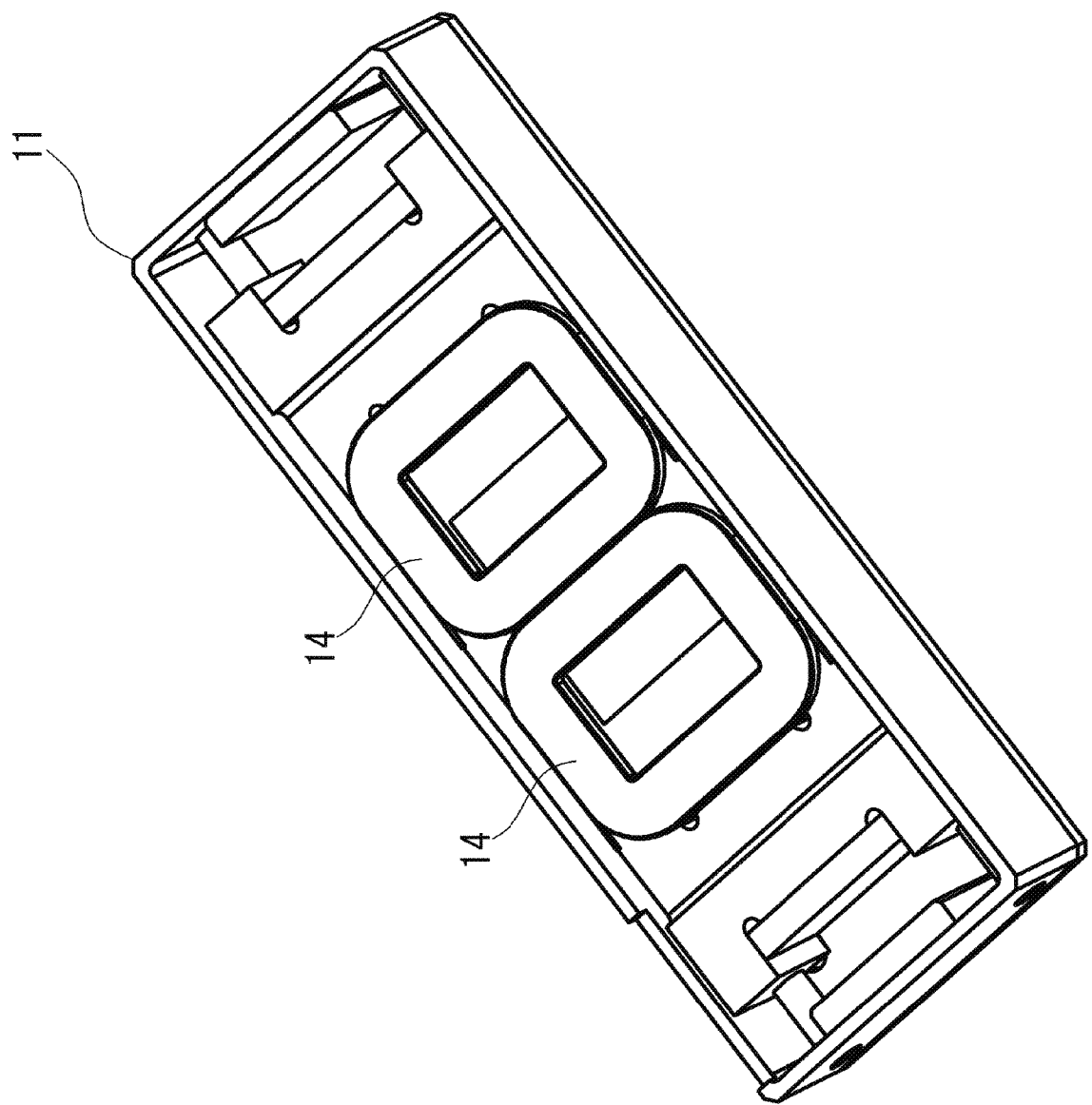
FIG. 22 illustrates yet another linear vibration actuator according to the embodiment of the present disclosure.
Figure 23A:
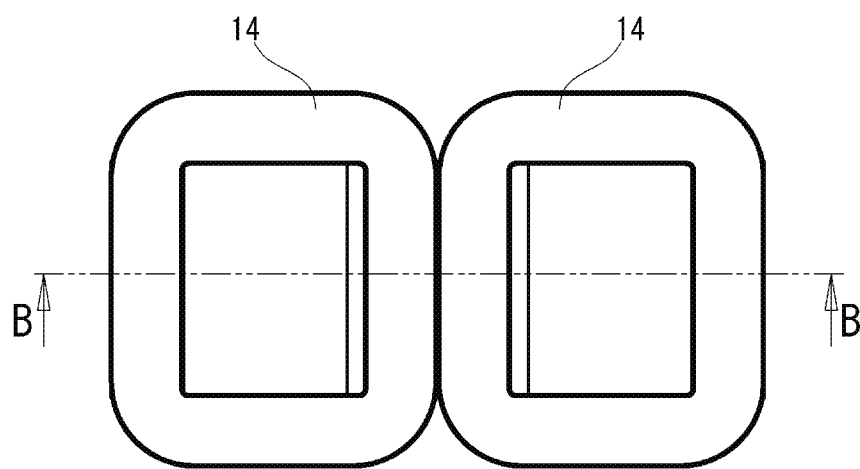
FIGS. 23A and 23B are cross-sectional views illustrating air gaps between the magnets and the coils in the linear vibration actuator illustrated in FIG. 22.
Figure 23B:
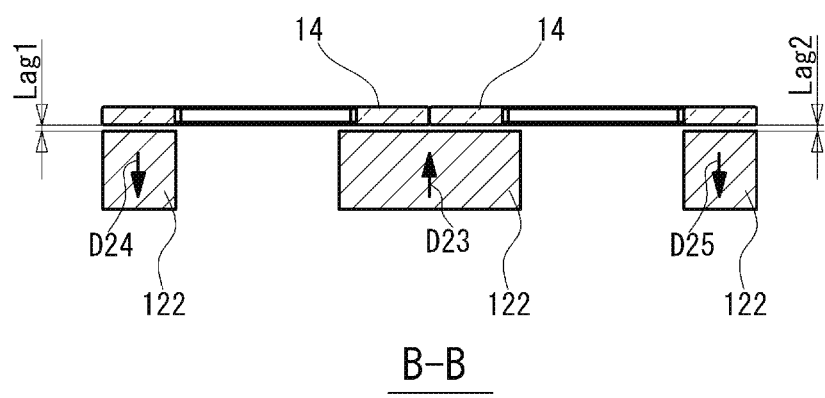

Example 4 will be described mainly with reference to FIGS. 22, 23A and 23B. FIG. 22 illustrates an inside of the linear vibration actuator of the present example. FIGS. 23A and 23B illustrate the planar coil 14 and the magnets (mover) 122 of the linear vibration actuator 1" of FIG. 22. FIG. 23A is a plan view thereof. FIG. 23B is a cross-sectional view illustrating a cross-section taken along line B-B shown in FIG. 23A.

When connecting the planar coils 14 in parallel, as illustrated in FIGS. 18A and 18B, consider a case of arranging the planar coils 14 in parallel in a direction in which the driving magnet 122 and the planar coils 14 face each other. In this case, a distance Lag1 and a distance Lag2, which are air gaps between the respective planar coils 14 and the magnet 122, are different from each other. Therefore, interlinkage magnetic flux density of the planar coil 14 far from the magnet 122 is smaller than that of the other planar coil 14.

On the other hand, as illustrated in FIGS. 22, 23A and 23B, by arranging the planar coils 14 connected in parallel adjacent to each other in the vibration direction, the distance Lag2 can be matched with the distance Lag1. Therefore, a larger amount of interlinkage magnetic flux can be obtained by the planar coils 14 as a whole. Therefore, under a condition that the surface magnetic flux densities of the magnets 122 used are the same and the total numbers of turns of the planar coils 14 are the same, a predetermined thrust can be obtained with a smaller current. With this configuration, since a volume that can be assigned to the mover in the housing does not change, the weight of the mover is maintained. Therefore, a predetermined vibration force can be obtained with a smaller current.

In applications such as the linear vibration actuator for the smartphone, the linear vibration actuator is required to have both large acceleration and low current consumption, not to mention being small. In this regard, since the linear vibration actuator described above can obtain the predetermined thrust with a smaller current while maintaining the volume and weight of the mover, it is possible to meet the above requirements.

As described above, the embodiments and the specific examples described above merely show representative forms of the technology of the present disclosure. The technology of the present disclosure is not limited to the embodiments and the examples. That is, the embodiments and the examples can be variously modified and implemented without departing from the gist of the technology of the present disclosure. Such a modified configuration is, of course, included in a category of the technology of the present disclosure as long as it includes the configuration of the near vibration actuator according to the technology of the present disclosure.

In the above-described examples and the like, as an example of the linear vibration actuator according to an aspect of the present disclosure, for example, the linear vibration actuators 1, 1' and 1" applied to the vibration function of the smartphone or the like are illustrated. However, application modes of the linear vibration actuator according to the aspect of the present disclosure is not limited.

In the above-described examples and the like, as an example of the linear vibration actuator according to the aspect of the present disclosure, the linear vibration actuator 1 in which the rectangular parallelepiped mover 12 is housed in the housing 11 that is the rectangular parallelepiped box is illustrated. However, the linear vibration actuator according to the aspect of the present disclosure is not limited to this, and may only include the housing extending in the vibration direction and the mover housed in the housing and extending in the vibration direction, and a specific shape of each part does not matter.

In the above-described examples and the like, the movers 12 and 22 are illustrated without particularly mentioning the number of the magnets 122 that are linearly arranged, as an example of the mover in the linear vibration actuator according to the aspect of the present disclosure. The mover of the linear vibration actuator according to the aspect of the present disclosure may only have the plurality of magnets linearly arranged in the vibration direction. The number of magnets in the mover can be set arbitrarily.

In the above-described examples and the like, the planar coil 14 is illustrated without particularly mentioning the number of arrangements on the flat surface 151, as an example of the planar coil in the linear vibration actuator according to the aspect of the present disclosure. The planar coil in the linear vibration actuator according to the aspect of the present disclosure may be simply wound in a flat shape on the flat surface that is in the vibration direction and faces the mover. The number of planar coils arranged on the flat surface can be set arbitrarily. Further, the flat surface on which the planar coils are arranged is not necessarily limited to an actual plane of the substrate or the like, and can also be interpreted as a virtual plane determined by the arrangement of the planar coils.

In the above-described examples and the like, as an example of the mover to which the Halbach array is applied in the linear vibration actuator according to the aspect of the present disclosure, the mover 12 (FIG. 7) is illustrated in which one column of the Halbach array is provided and the magnetic force is increased only in one plane. However, the mover to which the Halbach array is applied in the linear vibration actuator according to the aspect of the present disclosure is not limited to this. The mover to which the Halbach array is applied in the linear vibration actuator according to the aspect of the present disclosure may have the Halbach array of two columns so that the magnetic force is increased in both planes. In this case, the larger vibration energy can be obtained by forming the plane on which the planar coils are arranged from the pair of planes sandwiching the mover between them.

In the above-described examples and the like, as one of methods of utilizing the empty space S11 (FIG. 8) formed by not mounting the planar coil 14 on the side of the bottom wall portion, it is mentioned that another weight member is disposed between the mover 12 and the first floating member 181. In this regard, the first floating member 181 may be omitted, and only the weight member may be disposed integrally with the mover depending on the conditions. For example, when the attractive force from the Halbach array mover toward the ceiling wall portion of the housing does not matter, the vibration energy can be increased also by omitting the first floating member 181 and disposing the weight member integrally with the mover.

In the example described with reference to FIGS. 12 and 13, as an example of the mover having a plurality of mover portions in the linear vibration actuator according to the aspect of the present disclosure, the mover 22 having the two mover portions 221 is illustrated. However, the mover having the plurality of mover portions in the linear vibration actuator according to the aspect of the present disclosure is not limited to this, and the number of mover portions can be set arbitrarily. Regarding the mover 22, as an example of the elastic connection of the plurality of mover portions 221, the connection through the magnetic spring 223 is illustrated. However, the elastic connection here is not limited to the connection through the magnetic spring, and may be the connection through the mechanical spring such as the coil spring or the leaf spring.

What is claimed is:

1. A linear vibration actuator comprising:
   a housing that extends in a predetermined vibration direction;
   a mover that is housed in the housing, extends in the vibration direction, and has a plurality of magnets linearly arrayed in the vibration direction;
   a guide portion that is housed in the housing and holds the mover to be allowed to linearly move in the vibration direction;
   a plurality of planar coils that are housed in the housing, are wound in a flat plate shape on a flat surface which is in the vibration direction and faces the mover, and linearly vibrate the mover in the vibration direction when receiving a drive current;
   a pair of first biasing magnets that are respectively arranged at both ends of the mover in the vibration direction; and
   a pair of second biasing magnets that are respectively arranged facing the pair of first biasing magnets in the housing, and respectively have the same polarities as those of the pair of first biasing magnets to bias the mover in the vibration direction, wherein
   the mover comprises an outer frame portion,
   the plurality of magnets linearly arrayed in the vibration direction and the pair of first biasing magnets are held integrally with the outer frame portion,
   the plurality of magnets linearly arrayed in the vibration direction are fixedly arranged inside the outer frame portion in a state of being surrounded on at least four sides, and
   the pair of first biasing magnets is fixedly arranged outside the outer frame portion in the vibration direction.

2. The linear vibration actuator according to claim 1, wherein an array of the plurality of magnets in the mover is an array including an N-S array in which magnetizing directions of two adjacent magnets are perpendicular to the flat surface and opposite to each other.

3. The linear vibration actuator according to claim 1, wherein an array of the plurality of magnets in the mover is an array including a Halbach array in which a magnetizing direction of one magnet of two adjacent magnets is perpendicular to the flat surface, while a magnetizing direction of the other magnet is parallel to the vibration direction.

4. The linear vibration actuator according to claim 3, wherein the first biasing magnet also serves as the other magnet at both ends of the Halbach array in the vibration direction.

5. The linear vibration actuator according to claim 4, wherein a width of winding of the planar coil in the vibration direction is equal to or less than a length of the one magnet constituting the Halbach array in the vibration direction.

6. The linear vibration actuator according to claim 4, wherein
   the guide portion comprises a rail member having a guide groove in which an end edge of the mover in the vibration direction is fitted linearly movable in the vibration direction,
   the flat surface on which the plurality of planar coils is arranged is one,
   there are further provided a first floating member disposed on a surface of the mover opposite to a side facing the flat surface on which the planar coils are arranged, and a second floating member disposed facing the first floating member on an inner surface of the housing,
   the first floating member and the second floating member are configured to float the end edge of the mover from the inner surface of the guide groove in combination, and
   the combination of the first floating member and the second floating member is the magnets, the magnet and a magnetic body, or the magnetic body and the magnet, which have mutually opposite polarities.

7. The linear vibration actuator according to claim 3, wherein a width of winding of the planar coil in the vibration direction is equal to or less than a length of the one magnet constituting the Halbach array in the vibration direction.

8. The linear vibration actuator according to claim 3, wherein
the guide portion comprises a rail member having a guide groove in which an end edge of the mover in the vibration direction is fitted linearly movable in the vibration direction,
the flat surface on which the plurality of planar coils is arranged is one,
there are further provided a first floating member disposed on a surface of the mover opposite to a side facing the flat surface on which the planar coils are arranged, and
a second floating member disposed facing the first floating member on an inner surface of the housing,
the first floating member and the second floating member are configured to float the end edge of the mover from the inner surface of the guide groove in combination, and
the combination of the first floating member and the second floating member is the magnets, the magnet and a magnetic body, or the magnetic body and the magnet, which have mutually opposite polarities.

9. The linear vibration actuator according to claim 1, wherein the housing comprises a peripheral wall portion, a bottom plate portion, and a ceiling plate portion, and the peripheral wall portion is formed of a soft magnetic material.

10. The linear vibration actuator according to claim 9, wherein at least a portion of the bottom plate portion and the ceiling plate portion, that faces the plurality of magnets linearly arrayed in the vibration direction is formed of a non-magnetic material.

11. The linear vibration actuator according to claim 9, wherein the bottom plate portion and the ceiling plate portion are each divided into three, and both end portions of the three are formed of the soft magnetic material.

12. The linear vibration actuator according to claim 1, wherein the flat surface includes a pair of flat surfaces sandwiching the mover between the flat surfaces.

13. The linear vibration actuator according to claim 1, wherein
the guide portion comprises a rail member having a guide groove in which an end edge of the mover in the vibration direction is fitted linearly movable in the vibration direction, and
there are further provided a first floating magnet disposed on the edge of the mover, and
a second floating magnet that is disposed facing the first floating magnet on an inner surface of the guide groove, and has the same polarity as that of the first floating magnet, so that the end edge is floated from the inner surface of the guide groove.

14. The linear vibration actuator according to claim 1, wherein
the guide portion is a rod-shaped guide shaft,
the guide shaft slidably holds the mover, and
a holder that can slide with the guide shaft is formed on an outer frame portion of the mover.

15. The linear vibration actuator according to claim 1, wherein the mover has a plurality of mover portions which is arranged in the vibration direction and in which adjacent mover portions are elastically connected to each other.

16. A linear vibration actuator comprising:
a housing that extends in a predetermined vibration direction;
a mover that is housed in the housing, extends in the vibration direction, and has a plurality of magnets linearly arrayed in the vibration direction;
a guide portion that is housed in the housing and holds the mover to be allowed to linearly move in the vibration direction;
a plurality of planar coils that are housed in the housing, are wound in a flat plate shape on a flat surface which is in the vibration direction and faces the mover, and linearly vibrate the mover in the vibration direction when receiving a drive current;
a pair of first biasing magnets that are respectively arranged at both ends of the mover in the vibration direction; and
a pair of second biasing magnets that are respectively arranged facing the pair of first biasing magnets in the housing, and respectively have the same polarities as those of the pair of first biasing magnets to bias the mover in the vibration direction, wherein
an array of the plurality of magnets in the mover is an array including a Halbach array in which a magnetizing direction of one magnet of two adjacent magnets is perpendicular to the flat surface, while a magnetizing direction of the other magnet is parallel to the vibration direction, and
a width of winding of the planar coil in the vibration direction is equal to or less than a length of hte one magnet consistuting the Halbach array in the vibration direction.

17. The linear vibration actuator according to claim 16, wherein the first biasing magnet also serves as the other magnet at both ends of the Halbach array in the vibration direction.

18. A linear vibratioin actuator comprising:
a housing that extends in a predetermined vibrtion direction;
a mover that is housed in the housing, extends in the vibration direction, and has a plurality of magnets linearly arrayed in the vibration direction;
a guide portion that is housed in the housing and holds the mover to be allowed to linearly move in the vibration direction;
a plurality of planar coils that are housed in the housing, are wound in a flat plate shape on a flat surface which is in the vibration diretion and faces the mover, and linearly vibrate the mover in the vibration direction when receiving a drive current;
a pair of first biasing magnets that are rtespectively arranged at both ends of the mover in the vibration direction; and
a pair of second biasing magnets that are respectively arranged facing the pair of first biasing magnets in the housing, and respectively have the same polarities as those of the pair of first biasing magnets to bias the mover in the vibration direction, wherein
an array of the plurality of magnets in the mover is an array including a Halbach array in which a magnetizing direction of one magnet of two adjacent magnets is perpendicular to the flat surface, while a magnetizing direction of the other magnet is parallel to the vibration direction,
the guide portion comprises a rail member having a guide groove in which an end edge of the mover in the vibration direction is fitted linearly movable in the vibration direction,
the flat surface on which the plurality of planar coils is arranged is one, there are further provided a first floating member disposed on a surface of the mover opposite to a side facing the flat surface on which the planar coils are arranged, and a second floating member disposed facing the first floating member on an inner surface of the housing, the first floating member and the second floating member are configured to float the end edge of the mover from the inner surface of the guide groove in combination, and the combination of the first floating member and the second floating member is the magnets, the magnet and a magnetic body, or the magnetic body and the magnet, which have mutually opposite polarities.

19. The linear vibration actuator according to claim 18, wherein the first biasing magnet also serves as the other magnet at both ends of the Halbach array in the vibration direction.

20. A linear vibration actuator comprising:

a housing that extends in a predetermined vibration direction;

a mover that is housed in the housing, extends in the vibration direction, and has a plurality of magnets linearly arrayed in the vibration direction;

a guide portion that is housed in the housing and holds the mover to be allowed to linearly move in the vibration direction;

a plurality of planar coils that are housed in the housing, are wound in a flat plate shape on a flat surface which is in the vibration direction and faces the mover, and linearly vibrate the mover in the vibration direction when receiving a drive current;

a pair of first biasing magnets that are respectively arranged at both ends of the mover in the vibration direction; and a pair of second biasing magnets that are respectively arranged facing the pair of first biasing magnets in the housing, and respectively have the same polarities as those of the pair of first biasing magnets to bias the mover in the vibration direction, wherein the guide portion comprises a rail member having a guide groove in which an end edge of the mover in the vibration direction is fitted linearly movable in the vibration direction, and there are further provided a first floating magnet disposed on the edge of the mover, and a second floating magnet that is disposed facing the first floating magnet on an inner surface of the guide groove, and has the same polarity as that of the first floating magnet, so that the end edge is floated from the inner surface of the guide groove.

* * * * *